(12) United States Patent
Chiang et al.

(10) Patent No.: US 7,115,513 B2
(45) Date of Patent: Oct. 3, 2006

(54) DOMAIN REVERSAL CONTROL METHOD FOR FERROELECTRIC MATERIALS

(75) Inventors: Tsung Yuan Chiang, Banciao (TW); Tze-Chia Lin, Taipei (TW); Benny Sher, Yongkang (TW); Ming-Hsien Chou, Holmdel, NJ (US)

(73) Assignee: HC Photonics Corporation, Hsinchu (TW)

( * ) Notice: Subject to any disclaimer, the term of this patent is extended or adjusted under 35 U.S.C. 154(b) by 202 days.

(21) Appl. No.: 10/933,804

(22) Filed: Sep. 3, 2004

(65) Prior Publication Data

US 2006/0049133 A1 Mar. 9, 2006

(51) Int. Cl.
*H01L 21/302* (2006.01)

(52) U.S. Cl. .................. 438/689; 438/725; 438/975; 216/23; 359/272

(58) Field of Classification Search ............ 438/689, 438/725, 975; 216/23; 359/272
See application file for complete search history.

(56) References Cited

U.S. PATENT DOCUMENTS

| | | | |
|---|---|---|---|
| 5,009,489 A * | 4/1991 | Eguchi et al. | 349/126 |
| 5,249,250 A | 9/1993 | Yamada et al. | 385/122 |
| 5,395,495 A | 3/1995 | Nozaki | 204/157.44 |
| 5,415,743 A | 5/1995 | Harada | 204/130 |
| 5,424,867 A | 6/1995 | Nihei et al. | 359/326 |
| 5,522,973 A | 6/1996 | Harada | 204/164 |
| 5,568,308 A | 10/1996 | Harada | 359/326 |
| 5,570,225 A | 10/1996 | Harada | 359/326 |
| 5,594,746 A | 1/1997 | Harada | 372/22 |
| 6,156,255 A | 12/2000 | Byer et al. | 264/406 |

* cited by examiner

*Primary Examiner*—Gregory Mills
*Assistant Examiner*—Lynette T. Umez-Eronini
(74) *Attorney, Agent, or Firm*—Saile Ackerman LLC; Stephen B. Ackerman

(57) ABSTRACT

A method for forming uniform, sharply defined periodic regions of reversed polarization within a unidirectionally polarized ferroelectric material proceeds as a two-step process. First, alignment keys are formed on upper and lower planar surfaces of a unidirectionally polarized ferroelectric material by producing a spaced pair of alignment key shaped domain reversed regions and etching alignment key shaped notches in the upper and lower surfaces where the domain reversed regions intersect the surface planes. These notches, being vertically aligned between the upper and lower surfaces, are then used to align photomasks over a surface coating of photoresist formed directly on the material surface or on $SiO_2$ layers coating the material surface. The photoresist is then patterned and may also be thermally hardened to form a plurality of regularly spaced open strips, through which conducting metal contacts or ion-exchanged regions may be formed or contacts to the ferroelectric surface can be directly made by liquid conductors to produce the desired polarization reversals by application of an electric field at different temperatures of the material.

78 Claims, 15 Drawing Sheets

DOMAIN REVERSAL CONTROL METHOD FOR FERROELECTRIC MATERIALS

BACKGROUND OF THE INVENTION

1. Field of the Invention

This invention relates to a fabrication method for creating patterned domain reversals in ferroelectric materials. The method can be applied to any ferroelectric material.

2. Description of the Related Art

Ferroelectric materials have internal electric dipole moments which can be made to manifest themselves on a macroscopic domain scale without the presence of external electric fields (hence the term "ferroelectric" by analogy with "ferromagnetic" for materials with domain scale magnetic dipole moments). These macroscopic polarizations are responsible for the optical properties of the materials through the important effects they have on the propagation of electromagnetic radiation. When the polarization of such materials is linearly dependent (or only very weakly non-linearly dependent) on the electric field strength of an electromagnetic wave propagating through the material, the effect of the linear polarization is to produce a constant refractive index, which is responsible for modifying the speed of the wave through the material. In such a linear case, an incident oscillating electromagnetic field at frequency $\omega$ produces an oscillation of the polarization at the same frequency $\omega$ which, in turn, produces a re-radiated electromagnetic field also of the same frequency but out of phase with the incident wave. The original incident wave, combined with the phase-varying re-radiated waves along the forward propagation direction of the incident wave, creates a net transmitted wave that moves through the material at an apparently slower speed but same frequency. The speed, $v(\omega)$, of the transmitted wave in the crystal, is defined as $c/n(\omega)$, where c is the speed of the wave in vacuum (ie., the speed of light) and $n(\omega)$ is the index of refraction of the medium which, as indicated, depends on the frequency $\omega$ of the wave (ie., the medium is generally dispersive). Another important parameter of the medium is $k(\omega)$, the propagation constant of the radiation, which is defined as: $k(\omega)=2\pi n(\omega)/\lambda$, where $\lambda$ is the wavelength of the wave in vacuum.

When the polarization of the crystal is made to change by the imposition of an external electric field that is not the oscillating field of the incident electromagnetic wave, then interactions between the wave and the material can occur which are not simply describable by a constant index of refraction that simply changes the wave speed. For example, the so-called electrooptic effect results when the application of a constant electric field is used to rotate the dipole moment directions of a crystal and to thereby change both the speed and the polarization direction of an incident wave.

If the polarization at a position x within the crystal is a non-linear function of the field at that position, the propagation of an electromagnetic wave can be affected in additional ways. For example, the propagation of a wave with frequency $\omega_1$ will lead to the propagation of a secondary wave with frequency $2\omega_1$, which is the second harmonic of the wave. If two waves, of different frequencies $\omega_1$ and $\omega_2$ simultaneously propagate through the non-linear crystal, there will be generated additional waves of frequencies $\omega_1+\omega_2$, $\omega_1-\omega_2$, $2\omega_1$ and $2\omega_2$. Each wave periodically modulates the polarization which the other wave sees and which it sees itself and, as a result, new waves are generated.

When waves at two different frequencies $\omega_1$ and $\omega_2$ and two different propagation constants $k_1$ and $k_2$ propagate a distance L through a non-linear crystal, one wave ($k_1$) can transfer power to the other wave ($k_2$) through the non-linearity of the polarization. The amount of power transferred after the wave has traveled a distance L in the crystal can be shown to be proportional to: $L^2(\sin x/x)^2$, where $x=(k_3-k_1-k_2)L/2=L\Delta k/2$ and $k_3$ is the propagation constant of the polarization wave. If $\Delta k$ is not zero, the transfer of power reaches a maximum value when the wave has propagated a distance called the coherence length, $L_c$, where $L_c\Delta k/2=\pi/2$, (ie. $L_c=\pi/\Delta k$). If $\Delta k=0$, the incident waves and the polarization wave are said to be phase matched and the power transfer increases along the entire length of the crystal and is proportional to $L^2$, where L is the length of the entire crystal. If $\Delta k$ is not zero, the maximum power transfer occurs within the coherence length, then goes to zero, then rises again in the next coherence length. In general, the power transfer within the coherence length is the maximum transfer possible, no matter through how many coherence lengths the waves propagate. Since obtaining a phase matched condition is very difficult in practice (it has been obtained using birefringent crystals) and will only occur at particular k values, an alternative approach to maximizing power transfer is through "quasi-phase matching" or QPM. QPM is obtained by changing the phase between the propagating wave and the polarization wave by $\pi/2$ every time the propagating wave moves through an additional coherence length. This can be accomplished by rotating the polarization direction within the crystal by 180° in successive coherence lengths. Unlike true phase matching, QPM can be obtained for a wave of arbitrary k value, providing the polarizations in the crystal can be rendered appropriately periodic in successive coherence lengths. Thus, by satisfying the QPM condition, the maximum power transfer is incremented in each successive passage of the wave through a coherence length, rather than falling to zero. Such a periodic rotation of polarization domains (domain reversals) of width $L_c$ is usually accomplished by the application of electric fields, electron beam patterning or proton exchange/heat treatment (of which more will be said in the following) and the process is called "poling." Although quasi-phase matching does not produce the amount of power transfer produced by genuine phase matching (because the factor $(\sin x/x)^2$ is 1 for $\Delta k=0$, but is $4/\pi^2$ for $L_c\Delta k=\pi/2$), it is much better than the non-QPM case. Much inventive effort has been expended in finding ways of rotating crystal polarizations in a periodic manner with the coherence length being the period.

A case of particular interest in modern technology occurs when $\omega_2=2\omega_1$, which is called frequency doubling or second harmonic generation (SHG). Obtaining a meaningful power transfer between an incident wave and its frequency doubled second harmonic allows the production, for example, of coherent green or blue light by the passage of near infra-red radiation from a solid state laser through a non-linear ferroelectric crystal. Since coherent infra-red radiation is easier to produce by laser action than coherent blue or green radiation, being able to obtain the green or blue by SHG is quite important. Such green or blue light is important for reading and writing optical storage disks. The coherence length needed to obtain efficient frequency doubling is given by: $L_c=\pi/(2k_1-k_2)$. Note that $2k_1-k_2$ is not zero because of the dispersion of the material, so true phase matching is generally not possible. As noted above, use of QPL by poling non-linear ferroelectric crystals such as congruent lithium niobate ($LiNbO_3$, or CLN) or stoichiometric lithium tantalate ($LiTaO_3$ or SLT) allows frequency doubling of radiation within the entire range of frequencies for which these crystals are transparent: (0.32 microns–5.5 microns)

for CLN and (0.27 microns–5.5 microns) for SLT. The following prior art teaches a variety of methods for patterning and reversing polarization domains to achieve QLM in non-linear ferroelectric materials.

Nihei et al. (U.S. Pat. No. 5,424,867), teaches a method for fabricating an optical wavelength converter with a high threshold for optical damage. It is pointed out that a crystal may be damaged by a second harmonic wave having a relatively low power of 2 mW at a wavelength of 477 nm. Within the method, periodic domain reversals are formed on a $LiNbO_3$ substrate which is covered by a thin, transparent conducting film of indium-tin-oxide (ITO). The film then dissipates surface charges formed by the polarization process without, at the same time, producing reflection or scattering which would degrade the signal. Within the method domain reversals within the crystal substrate are accomplished by an electron beam having an energy between 20–30 kV. The period of the domain reversals is set to 4.7 microns which allows a first order period of 946 nm to produce a second order harmonic of period 477 nm.

Yamada et al. (U.S. Pat. No. 5,249,250) notes that the depth of a domain reversal and the width of a domain reversal (pitch) are related so that a narrow pitch (high frequency) results in a shallow depth. A shallow depth reduces the region of the crystal through which the SHG will occur. To solve this problem, Yamada teaches the formation of domain reversed regions by first polarizing the crystal uni-directionally (a single domain), then irradiating the crystal surface with a 15 kV electron beam in a pattern of regularly spaced parallel strips. An important aspect of this method is that the inverted domain structure can be formed without adversely affecting the index of refraction of the crystal.

Nozaki et al. (U.S. Pat. No. 5,395,495) teaches a method of forming domain reversals within a ferroelectric crystal wherein a high resistance layer is first formed on a uni-directionally polarized crystal surface and a charged particle beam is then directed into the crystal through the layer. This method alleviates the problem of forming effective domain reversals in the vicinity of the crystal surface.

Harada et al. (U.S. Pat. No. 5,415,743) teaches a method of forming sharply defined domain reversals that extend through the entire thickness of the ferroelectric crystal. The method teaches the formation of proton-exchanged regions on a unipolarized crystal and then heating the regions by the application of external electric fields. Also taught in the method is the formation of a Ti-diffused region which is also heated by an electric field, forming ion-implanted regions which are heated by an electric field and irradiating selected regions with light, followed by subsequent field treatment. The electric field in each of these methods is provided by a corona discharge.

Harada et al. (U.S. Pat. No. 5,568,308) teaches the formation of domain reversals in a MgO-LN non-linear unipolarized ferroelectric crystal by first proton-exchanging an appropriate region and then applying patterned electrodes to a surface of the crystal and creating an electric field between the electrodes. The electrodes consist of a separated pair formed on an upper surface of the crystal wherein one of the pair is comb-shaped and the other of the pair is rectangular. In an alternative embodiment, the field is provided by a corona wire.

Harada et al. (U.S. Pat. No. 5,570,225) teaches the formation of domain reversals in a MgO—$LiNbO_3$ or a MgO—$LiTaO_3$ non-linear unipolarized ferroelectric crystal by first proton-exchanging an appropriate region, diffusing Ti through the region or diffusing Li through the region and then applying electrodes to a surface of the crystal and creating an electric field by applying a direct or pulsed current to the electrodes.

Harada et al. (U.S. Pat. No. 5,522,973) teaches the formation of domain reversals in a MgO—$LiNbO_3$ or a MgO—$LiTaO_3$ non-linear unipolarized ferroelectric crystal by first proton-exchanging an appropriate region and then applying patterned electrodes to a surface of the crystal and creating an electric field between the electrodes. The electrodes consist of a separated pair formed on an upper surface of the crystal wherein one of the pair is comb-shaped and the other of the pair is rectangular. In an alternative embodiment, the field is provided by a corona wire.

Harada et al. (U.S. Pat. No. 5,594,746) teach a method for forming domain reversals in a ferroelectric crystal using a corona wire and a pattern of electrodes formed on the crystal. There is also taught an apparatus for creating the domain reversals comprising the electrode, the corona wire, a power source and an evacuated chamber.

Byer et al. (U.S. Pat. No. 6,156,255) teach a method for forming patterned domain reversals in a non-linear ferroelectric material using an electric field applied by means of spaced conductors. There is also taught a method of first characterizing the material to determine the most efficient way to achieve the desired result. The characterization seeks to establish the proper application of surface treatments as well as the best geometry of the crystal.

The methods disclosed above produce some disadvantageous effects. In particular, Ti indiffusion, Li outdiffusion and proton exchange followed by heat treatment, produces undesirable changes in the index of refraction of the material. The use of corona discharge methods and the use of high temperature thermal cycles and vacuum processing increase fabrication complexity and expense. In addition, such processes can damage crystal surfaces and, thereby, adversely affect the refractive properties of the crystal. The disavantages of the various methods can be summarized as follows:

(1) Many of the methods cited above produce high temperatures which cause low throughput and process control difficulties. A ferroelectric material should be heated to the Curie temperature to reduce the magnitude of the external field required to create domain reversals in all methods except the E-field method (electric field between applied electrodes) and the corona discharge method. Thus, the average operating temperature is approximately 500° C., which can cause wafer breakdowns, lead to stresses in the heating and cooling cycles and also result in the diffusion of metals into the ferroelectric material.

(2) The necessity of high vacuum processing slows down the process cycle and reduces throughput. Domain reversal techniques based on electron discharge require high vacuum to prevent interference from the environment and arcing between discrete electrodes. A vacuum of the order of $10^{-7}$ Torr takes a long time to produce.

(3) The depth of the domain reversal is often too shallow to use a bulk device like a solid state laser chip. Most domain reversal processes use surface chemical reactions, such as Ti in-diffusion, $Li_2O$ out-diffusion or proton exchange to lower the Curie temperature. In these cases, the depth of domain inversion is on the order of several microns. It is, therefore, only suitable to use such domain-reversed crystals in conjunction with surface devices such as wave-guides or surface acoustic wave (SAW) devices. To use bulk devices as radiation sources would require a ferroelectric device with domain reversals to a depth of millimeters.

(4) The scanning rate of domain reversals is very slow in most methods. To obtain a high quality (sharply defined) domain reversal, requires the use of slow methods, such as electron-beam writing or corona discharge.

Based on the limitations described above, we conclude that the E-field method (electric field produced between electrodes deposited on the material) has more advantages than the other methods. The chief disadvantages of this method are seen when the domain reversals must have a short period (narrow width) of about 10 microns or less and the wafer thickness is about 0.5 mm in CLN. In this case, the domain walls do not retain a planarity between the upper and lower surface planes of the crystal (between the +z and the −z surfaces). Moreover, in thicker wafers, the domain wall planarity is even worse. To alleviate these problems, the present invention teaches a double-sided poling process for ferroelectric domain reversals which also includes a new alignment technique. The method facilitates well defined poling in large area wafers and yields uniform domain reversals with a good, controllable process duty cycle and high quality domain walls.

SUMMARY OF THE INVENTION

A first object of this invention is to provide a method for forming short period domain reversals in large area, thick (>0.5 mm) wafers of non-linear ferroelectric materials.

A second object of this invention is to provide such a method that forms well defined domain regions with planar sides.

A third object of the present invention is to provide such a method that will form domain reversed regions extending uniformly from an upper surface plane of the ferroelectric material to a lower surface plane of the material.

A fourth object of the present invention is to provide a method that achieves the foregoing objects within a well controlled and rapid process cycle.

A fifth object of the present invention is to provide high quality domain reversed non-linear ferroelectric crystals suitable for use in optical frequency conversion processes for coherent light generation and other optical signal processes that require sum frequency generation (SFG), difference frequency generation (DFG), optical parametric oscillators (OPO), optical parametric generation (OPG) and cascaded non-linear frequency conversion via second order material non-linearity.

A sixth object of the present invention is to provide high quality domain reversed non-linear ferroelectric crystals suitable for use in optical modulation, optical switching and beam deflector operations through the electrooptic (EO) effect.

The objects of the present invention are achieved by use of a double-sided E-field domain reversal technique (poling) that produces high domain reversal quality control on both the upper (+z) and lower (−z) surfaces of a wafer of ferroelectric material, such as a wafer of congruent $LiTaO_3$ (CLT), stoichiometric $LiNbO_3$ (SLT), MgO doped CLT, or MgO doped CLN. Two methods are sequentially combined to achieve the objects described herein, one method being used to create specific domain reversals along the direction of non-linear polarization to create an alignment key, the other using photolithographic image processing wherein a patterned photolithographic mask (photomask) is accurately aligned and positioned using the alignment key produced by the first method. The aligned photomasks are then used to create patterned layers of photosensitive material (photoresist in the preferred embodiments) on upper, lower and both crystal surfaces, depending upon the particular embodiment. The patterned photoresist can be treated thermally to produce a patterned insulating layer or a patterned layer to be used as a mask in forming patterned conducting layers or to be used as a mask through which the underlying substrate can be further treated. The combined process is described briefly below and will be illustrated in further detail with the use of illustrations within the Description of the Preferred Embodiments.

(1) Domain Reversal Alignment Method For Creating Key.

This method utilizes the natural orientation of the crystal (also referred to, interchangeably, as the wafer or substrate) to create a double-sided alignment key on first and second (upper and lower or +z and −z will sometimes be used) crystal surfaces. The "alignment key" is a simple pattern within a crystal surface which is formed by etching the crystal surface subsequent to the creation of a specific domain reversal pattern by the application of an electric field. The field is applied to the crystal surface through two separated "alignment key-shaped" openings (various shaped openings, such as parallel strips, may be used depending upon the application) in a layer of photoresist, so the width of each domain-reversed region is substantially the width of the opening. The etch reveals the width of the domain reversal that is created by the electric field, by etching away a portion of the crystal surface that intersects the domain-reversed region within the bulk of the crystal. The alignment key now comprises the etched indentations within one or both crystal surfaces, which are aligned along the crystal c-axis from top surface to bottom surface if both surfaces are involved. The key then provides a method of aligning photomasks vertically above each other to create, for example, a full pattern of aligned electrodes which are optimally positioned to produce the required pattern of domain reversals. Within a first embodiment of the domain reversal alignment method (to be described fully below), a heat-treated layer of photoresist which has been patterned in the alignment key pattern, produces a patterned high-voltage insulating layer. An electric field applied over the photoresist in this alignment pattern then creates domain reversals beneath that pattern. The actual alignment key is then revealed and produced by etching top and bottom surfaces of the crystal with, preferably, an HF etch. The shallow indentations produced by the etching then form the actual alignment key. In a second embodiment of the method, no photoresist is applied, instead there is a deposition of metal electrodes in a predetermined alignment pattern directly upon the crystal surface. An electric field is applied by placing a potential between the electrodes, creating a domain reversal beneath the electrodes. Again, a surface etch reveals the domain reversals and produces the alignment key. The common element in both methods is that a set of patterned notches, aligned vertically on top and bottom crystal surfaces, has been created.

(2) Image Processing Alignment Method, Using Alignment Keys.

In the application of this method, alignment keys have first been produced on upper and lower surfaces of a crystal by the first or second method of the domain reversal method described above. In one of many embodiments of the method, a layer of photoresist is then formed on an upper or lower crystal surface or on both. A photolithographic mask (photomask), having predetermined patterns for domain reversal applications formed therein, is then placed over the photoresist coated crystal surface and aligned by using the alignment keys already formed. The photoresist is then exposed by the UV light through the aligned photomask, developed to reveal the designed patterns and the remaining photoresist is hardened by a thermal process (such as heating the substrate). A similar process may then applied to the lower crystal surface, depending on the particular embodiment of the method. The patterned photoresist on each surface of the crystal is thereby mutually aligned by virtue of the alignment keys previously formed.

Once the patterned photoresist has been formed by the combined methods described above, patterned electrodes (either metallic conductors or conducting liquids) can be formed on the crystal surfaces, contacting the surfaces in accord with the pattern in the photoresist. These electrodes are then used to apply a polarization reversing electric field within the crystal, and thereby to define an embodiment of the invention. Before the application of the electric field it may be particularly advantageous to heat the crystal to an optimized temperature. Such temperature optimization, which depends on the material and thickness of the crystal, can produce domain reversals of improved quality and the use of such temperature optimization, in conjunction with specific methods of forming electrodes and applying electric fields, should be considered as defining an additional embodiment of the present invention.

In alternative embodiments, the patterned photoresist can be used to form a patterned insulating layer or it can be used as a mask through which to further treat the crystal substrate, as with an ion-exchange process. The remainder of the description of the present invention and of its various embodiments is concerned with the variety of methods that can be advantageously applied to creating domain reversals once the aligned patterning has been created. These detailed descriptions will now be given within the context of a series of illustrations that specifically point out the elements of the method in its various embodiments.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying figures, wherein:

FIGS. 3–12 schematically represent the process steps of preferred embodiments of the present invention that can be applied in achieving the objects of the present invention. More specifically, the figures, when taken together, illustrate 12 embodiments of the image processing alignment method that can be combined with either of the two embodiments of the domain reversal alignment method and to which heating may or may not be applied to produce the many embodiments of the combined processes which comprise the invention. Briefly, FIGS. 3–12 show the following:

FIGS. 7d&e illustrate the same basic configuration, with ion-exchanged regions now being formed only below an upper surface (d) and below both surfaces (e).

FIGS. 10d and e illustrate the fabrications of FIG. 10c wherein ion-exchanged regions are formed in the upper surface instead of the lower surface (10d) and in the upper and lower surfaces (10e).

FIGS. 12d and e illustrate the fabrications of FIG. 12c wherein ion-exchanged regions are formed in the upper surface instead of the lower surface (10d) and in both the upper and lower surfaces (10e).

DESCRIPTION OF THE PREFERRED EMBODIMENTS

The preferred embodiments of the present invention include methods of forming polarization domain reversals of a controlled and high quality within a non-linear ferroelectric material. Each embodiment comprises the successive application of two processes: (1) a process for forming alignment keys on surfaces of the ferroelectric material, which is a common aspect of each embodiment and which can be carried out in two different versions; and (2) a process (having multiple versions, all described below) for using a photolithographic mask (photomask), aligned on the surfaces by the alignment keys, to create accurately patterned and aligned conducting layers, insulating layers or ion-exchanged regions, by means of which electric fields can be applied to the material to create domain reversals. The actual application of the fields is made to either exposed regions of the substrate which are coated with a liquid conductor just prior to the field application, or to regions of the substrate on which conducting layers have been formed to electrically contact the substrate. These electric fields may be applied during and/or subsequent to the ferroelectric material being heated to an optimized temperature, which is generally between room temperature and 250° C., but will have specific values for particular materials as is described in greater detail below. Applying the fields under these temperature conditions can produce domain reversals of improved quality. Such substrate heating forms an important alternative embodiment of each individual embodiment of the present invention.

Figure 1A:
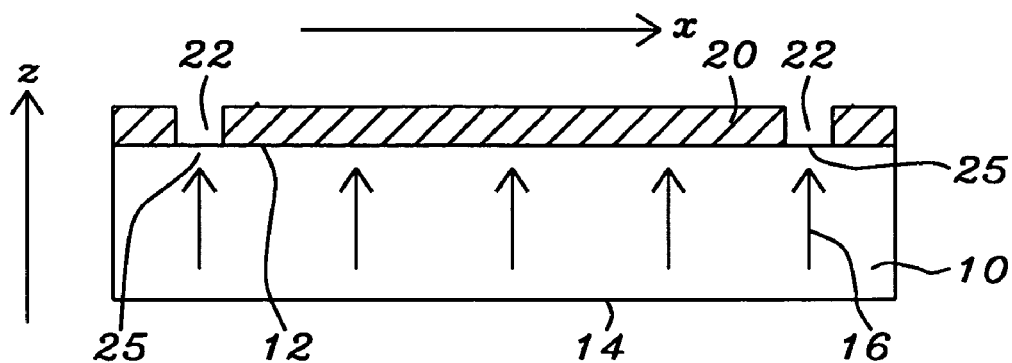
FIGS. 1a–c schematically illustrate the formation of an alignment key using a first embodiment of the domain reversal alignment method.
Figure 1B:
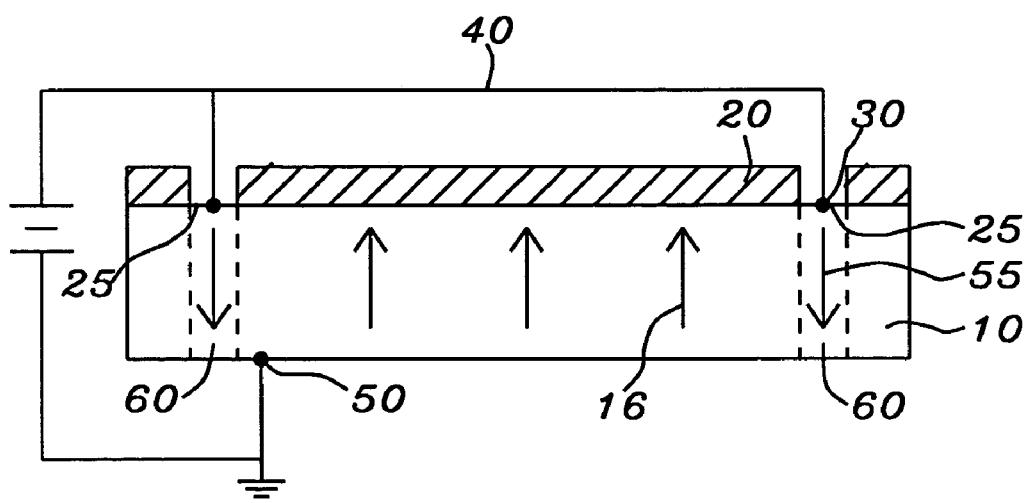
Figure 1C:
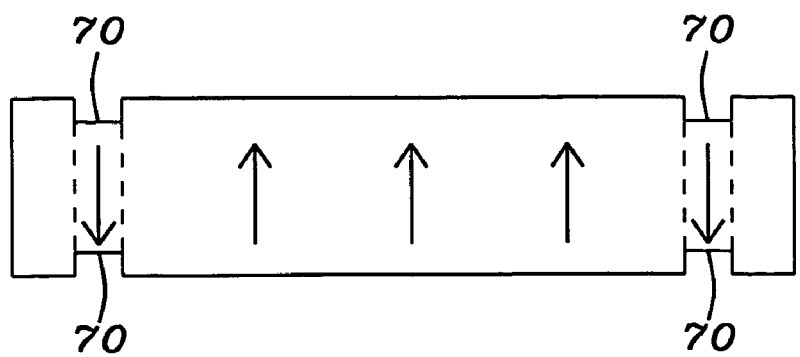

Referring first to FIGS. 1a–c, there is schematically illustrated the formation of an alignment key on a ferroelectric crystal using the crystal's natural orientation and a first version of the domain reversal alignment method. FIG. 1a shows a ferroelectric crystal substrate (10), which can be provided in wafer or crystal form and which can be any of a variety of ferroelectric materials exhibiting non-linear polarization, preferably congruent $LiNbO_3$ (CLN) already unidirectionally polarized in the +z direction. Other materials such as stoichiometric $LiTaO_3$ (SLT), MgO doped CLN or SLT can also be used. It should be noted that in all descriptions that follow, the provided crystal is assumed polarized in the −z to +z direction, ie, the polarization direction pointing from the second surface towards the first surface. Certain of the embodiments may superficially seem to differ in that structures fabricated on a first and second surface are then fabricated on a second and first surface. However, the two surfaces may differ in their interfacial states due, among other things, to the orientation of the crystal polarization, so the embodiments are, in fact, distinct.

The crystal substrate preferably has a substantially planar first surface (12), also referred to as the +z surface, and a substantially planar second surface (14), also referred to as a −z surface, which is parallel to and opposite the first surface. The vertical direction (and polarization direction) is hereinafter the −z to +z direction. A direction of spontaneous unidirectional polarization in the +z direction is shown in the figure by a plurality of arrows (16). The direction transverse to the plane of the figure will be referred to as the y-direction and the direction within the plane of the substrate surface and transverse to both the y and z directions will be referred to as the x-direction. A layer of photosensitive material (photoresist being used in these embodiments) (20) has been formed on the first surface (12) and has been patterned by appropriate radiative exposure to create a set of arbitrarily shaped patterns (22), called "alignment key patterns," to be used in the alignment of photolithographic masks used in subsequent steps of the process. Although the pattern (22) is shown for simplicity as a single notch, it can be quite arbitrary.

Referring next to FIG. 1b, there is shown the patterned photoresist (20) of FIG. 1a, which has now been thermally processed (hard-baked) to form an insulating layer. This processing can be accomplished by several means including an oven, a hot-plate, a hot bath, a microwave or UV irradiation. Electrical contact (30) with the exposed substrate surface (25) is made by means of a liquid conductor such as solutions of acids including benzoic or phosphoric acids or solutions of salts such as LiCl or KOH, that coat the surface. An electric field in the −z direction is established by completing a circuit (40) between the first layer contacts (30) and the second substrate surface (assumed grounded) (50). The field reverses the direction of polarization, as shown by the arrows (55) beneath the openings in the photoresist, creating within the bulk of the substrate a domain (60), outlined in broken lines, of reversed polarization. The strength of the electric field depends on the crystal material. For congruent $LiNbO_3$, an adequate potential difference must exceed 20.75 kV/mm at room temperature. MgO doped CLN requires only 4 kV/mm at 180° C. In all future references to the production of electric fields to produce domain inversions, the use of the above described potential differences is understood.

Referring next to FIG. 1c, there is shown the substrate subsequent to the removal of the insulating coating (hardened photoresist) from the upper surface. The first and second substrate surfaces are now etched with an etchant such as HF to express the alignment key shape by producing vertically aligned shallow indentations (notches) (70) in the first and second surface planes where the reversed domain (broken lines) intersects the surfaces.

Figure 2A:
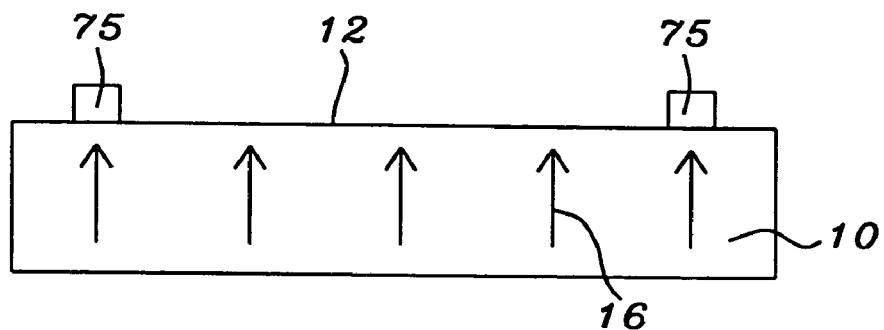
FIGS. 2a–b schematically illustrate the formation of an alignment key using a second embodiment of the domain reversal alignment method.

Referring next to FIG. 2a, there is schematically illustrated the formation of an alignment key using a second version of the domain reversal alignment method applied to a unidirectionally polarized crystal (arrows (16)). In this version, a conducting metal or conducting oxide layer forming a set of alignment key patterns (75) is deposited directly on the first substrate surface (12). The metal is preferably Al, Cu, Ni, Cr, NiCr, Au, Ag, Ta, Ti, Pt or Mo and the oxide is preferably $IrO_2$, $RuO_2$ or $SrTiO_3$.

Figure 2B:
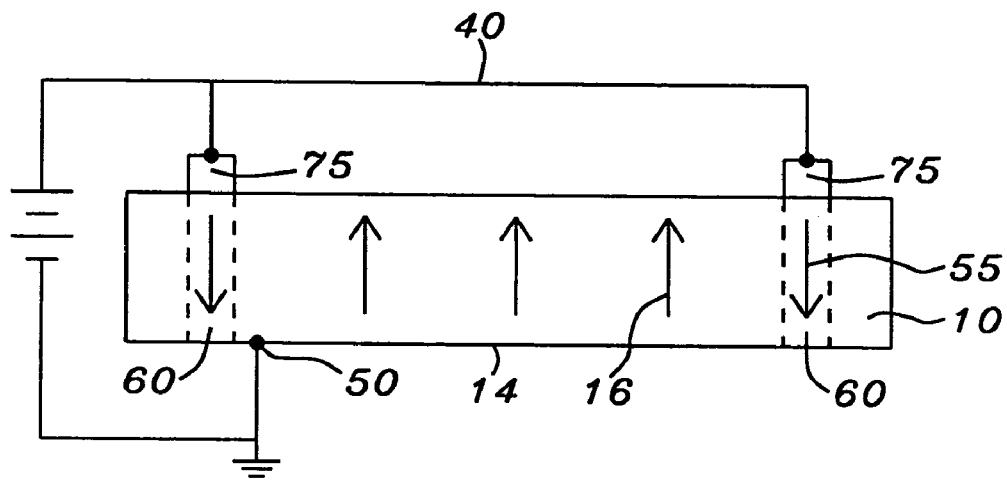

Referring next to FIG. 2b, there is shown a circuit (40) connected between the conducting strips (75) and the second substrate surface at which it is grounded (50). The circuit creates a potential difference between the strips and the second substrate surface which produces an electric field that reverses the polarization (55) within the bulk (interior region) material beneath the strips, creating, therein, a domain of reversed polarization (60) (shown in broken lines). At this point in the process, the steps outlined in FIG. 1c are followed and the surface intersection of the reversed domain region is etched to produce the alignment key.

First Preferred Embodiment.

Figure 3A:
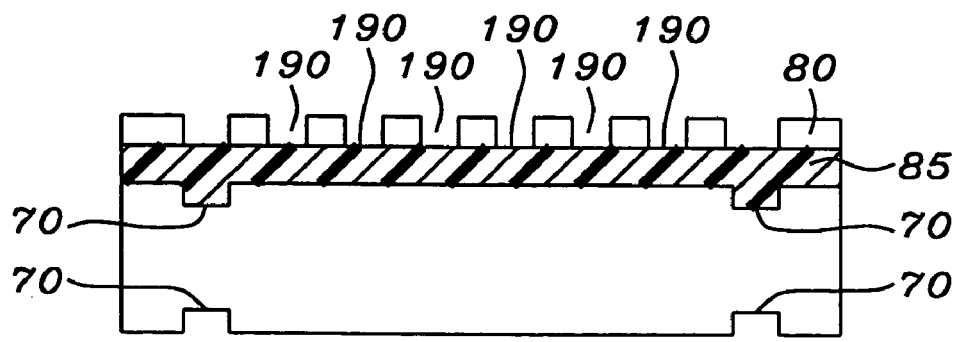
FIGS. 3a–c schematically illustrate the application of a first embodiment of the image processing alignment method to a crystal having an alignment key formed thereon, followed by patterned photoresist formation and the application of an electric field via a liquid electrode to create domain inversions.
Figure 3B:
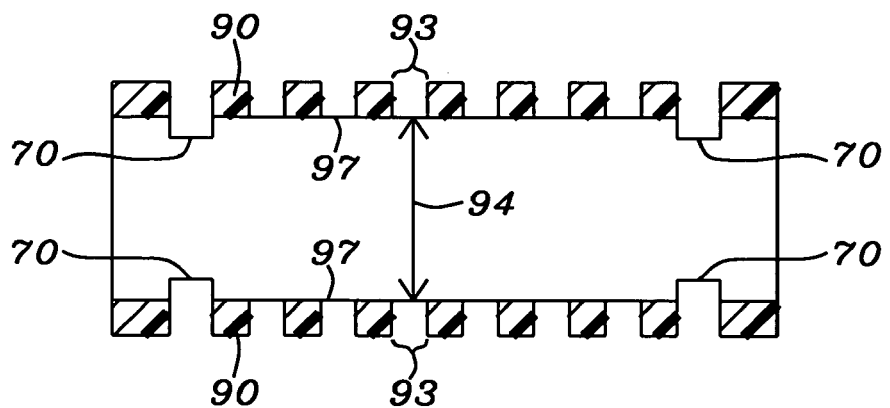
Figure 3C:
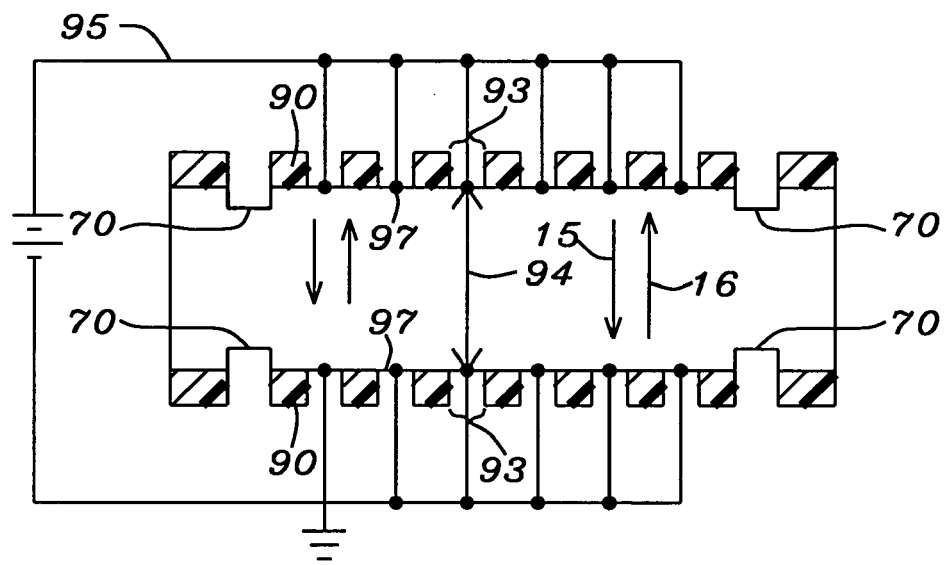

Referring now to FIGS. 3a–c, there is schematically illustrated the application of a first version of the image processing alignment method to a crystal having alignment keys formed thereon, producing, thereby, a first preferred embodiment of the invention. It is understood that all of the preferred embodiments of the present invention can take as an initial step the provision of a wafer having alignment keys produced by either version of the method as described and illustrated by FIGS. 1a–c or by FIGS. 2a and b.

Referring first to FIG. 3a, there is shown a substrate having alignment keys formed thereon in accord with the illustration of FIG. 1c. A layer of photosensitive material, photoresist in this and subsequent embodiments, will be formed on both the first and second surfaces of the wafer and patterned through a photolithographic mask (photomask) which is aligned by the alignment keys (70). This process will be described by reference to the formation of the patterned photoresist on the first substrate surface, it being recognized that, in this embodiment, the second surface formation proceeds identically, although the first and second surfaces may differ in their surface states and reactions to processing as a result of the substrate polarization. The photomask (80), which is indicated extremely schematically as a series of radiation-transparent openings (190) and opaque regions (80), is placed over the photoresist layer (85) and is aligned to the alignment keys (70). As is well known in the art, the exposed photoresist is developed to remove unexposed portions, or, in the case of certain types of photoresist, to remove exposed portions.

Referring next to FIG. 3b, there is shown the patterned photoresist (90) on both the first and second surfaces of the substrate. The openings which define the pattern pass through the entire thickness of the photoresist and thereby expose corresponding regions of the first and second substrate surfaces (97). The alignment keys (70) have produced correctly aligned openings (93), the alignment being shown by an exemplary arrow (94) in the z-direction between both photoresist layers. It is understood that the pattern in this and the following embodiments is typically periodic slits whose widths are coherence lengths within the ferroelectric substrate, but other patterns are possible. The patterned photoresist is now thermally treated (baked) by raising the substrate to a temperature of approximately 180° C. The baked photoresist is hardened, thereby, and becomes an effective insulating material.

Referring next to FIG. 3c, there is schematically shown an electric-field-producing circuit (95) formed between regions of the substrate surface (97) exposed by the patterned, hardened photoresist. The exposed substrate is coated with a liquid conductor such as those indicated above to enhance the electrical contacts. In this process, the insulating properties of the hardened photoresist serve to isolate the electrically contacted surface regions from each other. An electric field in the −z direction is produced between the corresponding exposed surface regions as a result of the contacts. Note that the term "corresponding" as hereinafter used will refer to regions or contacts on upper and lower surfaces that are vertically opposite each other and form the upper and lower boundaries of a polarization domain. Arrows (16) and (15) show the regions of original +z polarization (16) and the regions of domain reversal (15) produced by the electric field.

Second Preferred Embodiment (Without and With Substrate Heating).

Figure 4A:
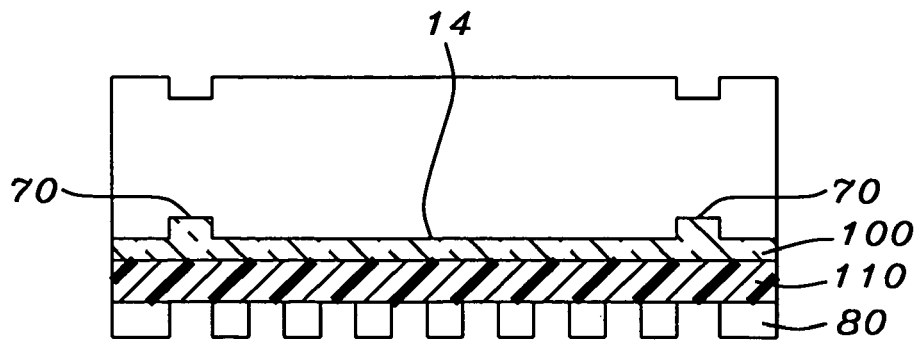
FIGS. 4a–d schematically illustrate the application of a second embodiment of the image processing alignment method to a crystal having an alignment key formed thereon. A patterned layer of $SiO_2$ is formed on a lower crystal surface and a patterned layer of hardened photoresist is formed on the upper surface of the crystal. An electric field is applied through liquid electrodes to create domain inversion.

Referring first to FIG. 4a, there is schematically illustrated the application of a second version of the image processing alignment method to a crystal having an alignment key formed thereon in accord with the description of FIG. 1c. A planar dielectric (insulator) layer of $SiO_2$ (100) of thickness between approximately 500 and 5000 angstroms, with approximately 2000 angstroms (200 nm) being preferred, is formed by sputtering or electron-beam deposition on a second crystal surface (14) and a layer of photoresist (110) is formed on the $SiO_2$. A photomask (80) like that also illustrated in FIG. 3a is formed on the photoresist and is aligned with the alignment keys (70).

Figure 4B:
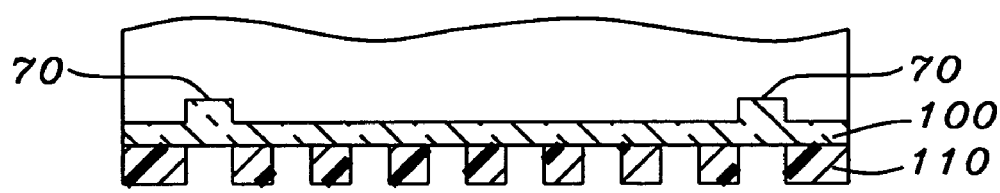

Referring next to FIG. 4b, there is seen a portion of the fabrication of FIG. 4a showing only the second substrate surface. The photoresist (110) is shown patterned through to the $SiO_2$ (100), then hardened by thermal processing in the same manner as described in reference to FIG. 3b. The hardened photoresist will be used as an etching mask to etch the $SiO_2$, which is done preferably using a buffered oxide etchant (BOE). Thermal processing as used in this invention and already noted includes heating by such means as a hot plate, an oven, a hot bath, a microwave or UV radiative exposure.

Figure 4C:
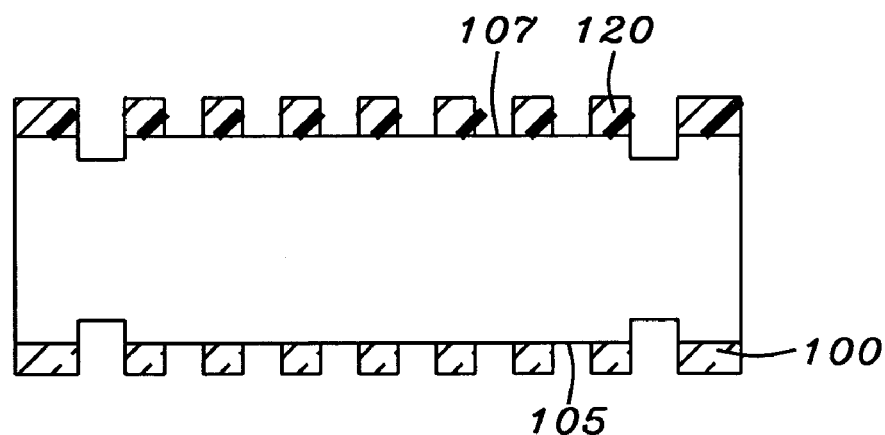

Referring now to FIG. 4c, the $SiO_2$ (100) is shown as having been etched through to the second substrate surface (105), using an etchant such as a buffered oxide etcher (BOE). The patterned photoresist has been removed. A first surface of the crystal is now coated only with photoresist which is patterned (120) through an identical photomask as illustrated in FIG. 4a. It is to be noted that the patterns on top and bottom surfaces are not exactly the same. When patterning processes are applied to both surfaces the use of the same mask or different ones depends on pattern design and domain reversal requirements.

The photoresist is thermally hardened as in FIG. 4b, to form an insulating layer and surface regions of the first substrate surface are exposed (107). As noted above, several methods are available for heating the photoresist to achieve the required hardening and the choice may be determined by the requirements of process throughput.

Figure 4D:
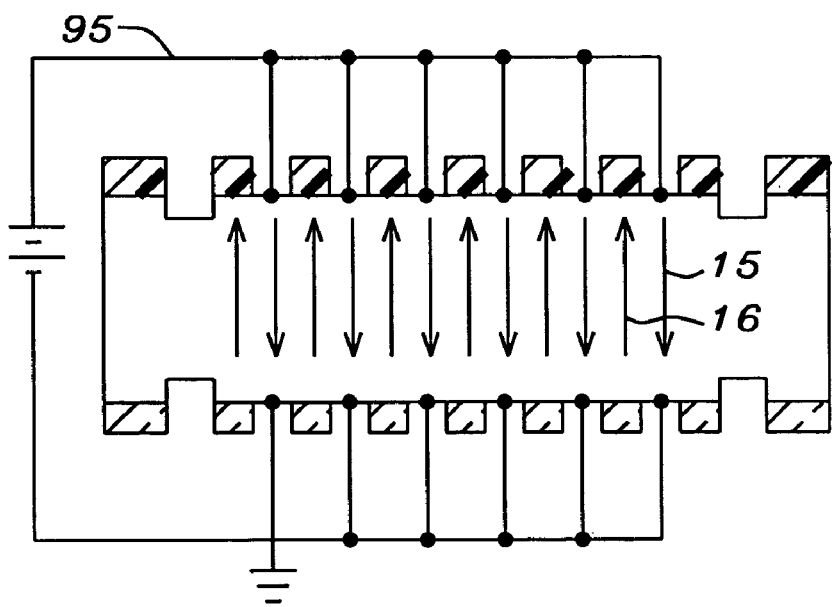

Referring to FIG. 4d, there is schematically shown a circuit (95) connected between the exposed upper and lower substrate surfaces through which an electric field is applied to create domain inversions shown by arrows (15). Original polarizations are shown by arrows (16).

Contact between circuit elements and the substrate surface is now obtained using liquid conductors as has already been noted. It is further noted that heating the substrate to an optimized temperature before and/or during the application of the electric field as shown in FIG. 4d may provide substantial benefits by improving the quality of the domain reversals produced by the application of the domain-reversing electric fields. Such heating, combined with the electric field application, is yet another embodiment of this invention.

Although $SiO_2$ has been used herein as an insulating layer, other suitable materials include $Al_2O_3$ or $Si_3N_4$ or, as already indicated, hardened photoresist. The choice of insulating materials is related to the temperature at which the substrate will be processed, as certain insulating materials may be subject to shape distortion at high temperatures. In a related matter, the choice of optimum processing temperature will itself depend on the material of the substrate.

Third Preferred Embodiment (Without and With Substrate Heating).

Referring again to FIG. 4a, there is schematically illustrated the first step in the application of a third version of the image processing alignment method to a crystal having an alignment key formed thereon in accord with the description of FIG. 1c. A planar layer of $SiO_2$ (100) of thickness between approximately 500 and 5000 angstroms, with approximately 2000 angstroms being preferred, is formed by sputtering or e-beam deposition on a second crystal surface and a layer of photoresist (110) is formed on the $SiO_2$. A photomask (80) is formed on the photoresist and is aligned with the alignment keys (70).

Referring next again to FIG. 4b, the photoresist (110) is shown patterned through to the $SiO_2$ (100), then hardened by thermal processing. The hardened photoresist will be used as an etching mask to etch the $SiO_2$ in accord with the etching process already described above with reference to FIG. 4b.

Figure 5A:
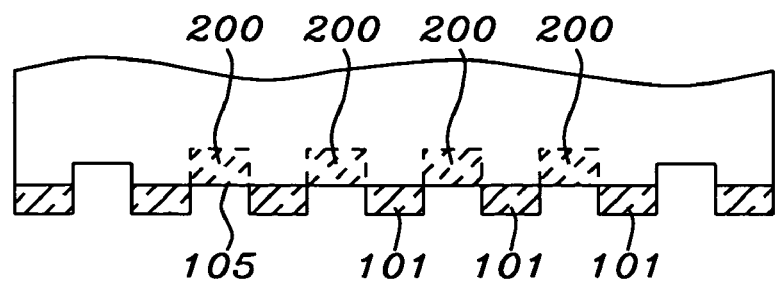
FIGS. 5a–d, when taken together with FIGS. 4a and b, schematically illustrate the application of a third embodiment of the image processing alignment method to a crystal having an alignment key formed thereon. A layer of patterned $SiO_2$ is formed on a lower crystal surface. An ion-exchange process is carried out within the substrate through the patterned $SiO_2$. A patterned hardened layer of photoresist is formed on the upper surface of the crystal. An electric field is applied through liquid electrodes to create domain inversion. Embodiments are illustrated in which ion-exchange is first carried out through the upper pattern and through both upper and lower patterns.

Referring next to FIG. 5a, there is shown the etched $SiO_2$ (101) produced from the fabrication of FIG. 4b and the results of an ion-exchange process which has been carried out within the substrate through the exposed surface regions (105) revealed by the patterned $SiO_2$. This process has produced the ion-exchanged regions indicated as (200). In this particular embodiment, such an ion-exchange process has been found to reduce domain spreading velocity beyond the immediate vicinity of the applied electric fields. It should be noted, however, that under different process conditions and using different substrate materials an ion-exchanged region can enhance domain spreading. The process of carrying out such an ion-exchange requires immersing the substrate in a benzoic acid hot bath at a controlled temperature to achieve an optimized ion-exchanged profile. This method is well known and will not be further described herein. In the following, all references to ion-exchange will refer to the method just described.

Figure 5B:
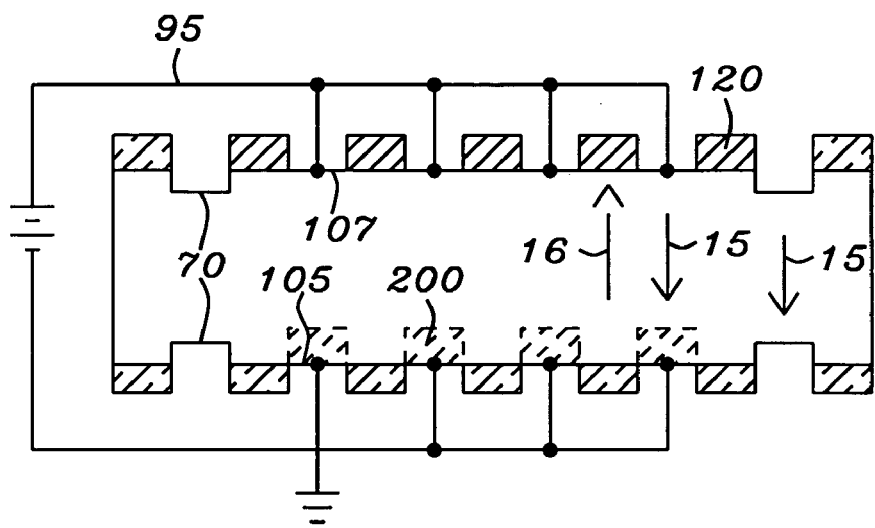

Referring to FIG. 5b, there is shown, schematically, a first surface of the crystal of FIG. 5a which is now coated only with photoresist and which is patterned (120) through a photomask in the manner illustrated in FIG. 4a. The photoresist has been thermally hardened to form an insulating layer. Exposed surface regions (107) of the first substrate surface are vertically aligned with the exposed surface regions (105) (through which the ion-exchange regions had been formed) of the second substrate surface. It has already been noted that several methods are available for heating the photoresist to achieve the required hardening and the choice may be determined by the requirements of process throughput. There is also schematically shown a circuit (95) connected between the exposed upper and lower substrate surfaces through which an electric field is applied to create domain inversions shown by arrows (16). It is noted that contact between circuit elements and the substrate surface is obtained using the liquid conductors discussed above. It is further noted that heating the substrate prior to and/or during application of the electric field can contribute substantially to improving the quality of the domain reversals produced by the electric fields and that proceeding in this manner constitutes an alternative preferred embodiment of the present invention.

Figure 5C:
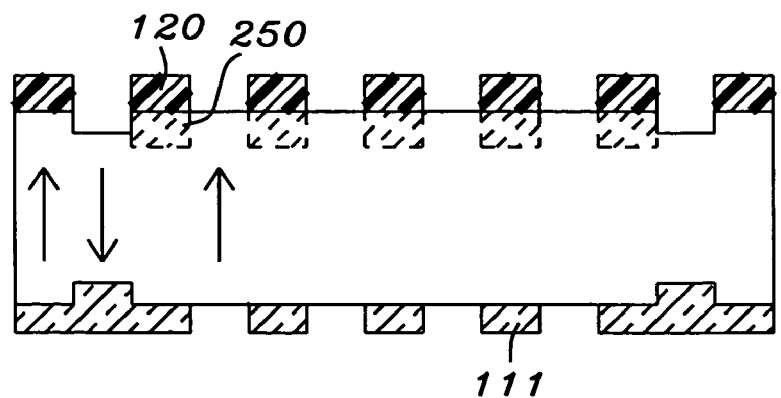
Figure 5D:
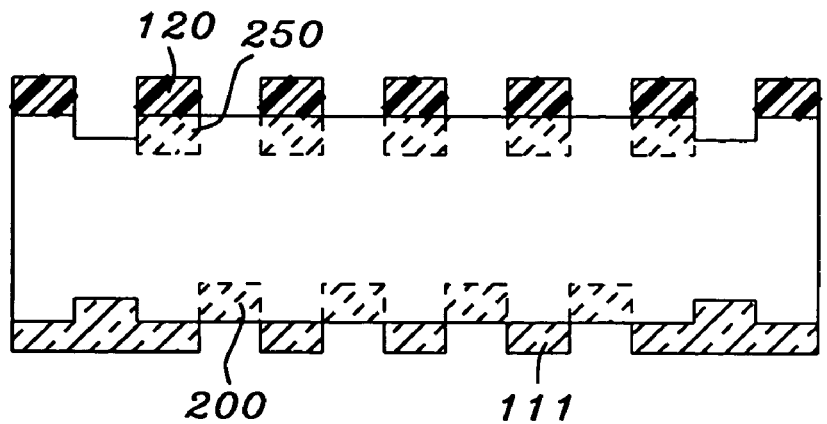

Referring next to FIGS. 5c and 5d, yet additional embodiments are schematically illustrated. In FIG. 5c ion-exchange has been first carried out beneath one substrate surface in regions (250) over which photoresist is subsequently patterned (120). First the ion-exchange is carried out in accord with the process already discussed relation to FIG. 5a. Then the photoresist layer is deposited and patterned.

In FIG. 5d, ion-exchange has been already carried out beneath both substrate surfaces in accord with the process of FIG. 5a. The regions under one surface (250) are subsequently covered by patterned photoresist (120), while the regions beneath the other surface (200) remain beneath exposed regions of the surface that are between patterned portions of an insulating layer (111). In the embodiment corresponding to either figure an electric field can be applied between exposed surface regions, or, in an alternative embodiment, the substrate can first be raised to an optimized temperature before the field is applied. Raising the substrate temperature before and or during application of the field has highly advantageous effects with regard to improving the quality of the domain reversed regions.

Fourth Preferred Embodiment (Without and With Substrate Heating).

Figure 6A:
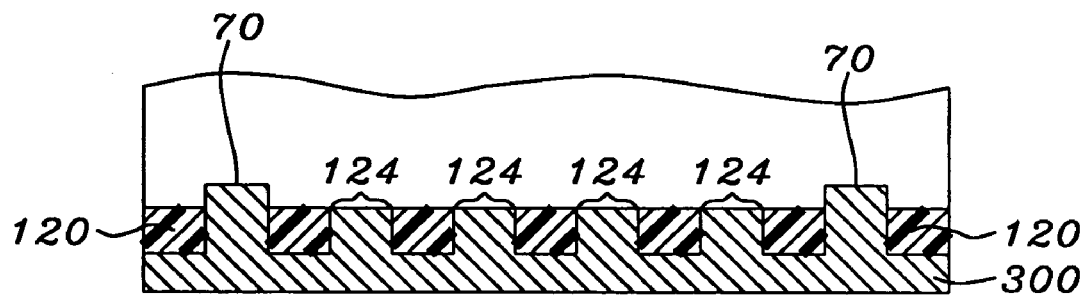
FIGS. 6a–d schematically illustrate the application of a fourth embodiment of the image processing alignment method to a crystal having an alignment key formed thereon. A patterned layer of conducting material is formed on a lower crystal layer. A patterned hardened layer of photoresist is then formed on the upper crystal surface. Electric fields are produced within the substrate between the lower surface patterned conductors and a liquid conductor contacting the upper surface through the openings in the patterned insulation.

Referring first to FIG. 6a, there is schematically illustrated the application of a fourth version of the image processing alignment method to a crystal having an alignment key formed thereon in accord with the description of FIG. 1c. The figure shows only the second surface, for simplicity. A first layer of photoresist is formed on the second surface of the wafer and patterned (120) through a photomask (not shown) which was aligned by the alignment keys (70). There is also shown a layer of conducting material (300) that has been deposited by DC sputtering over the patterned photoresist (120). The conductor layer covers the photoresist and conformally fills the spaces (124) between the strips of patterned photoresist and thereby also contacts the exposed surface of the wafer. The layer can be a metal, which is preferably Al, Cu, Ni, Cr, NiCr, Au, Ag, Ta, Ti, Pt or Mo or a conducting oxide, the oxide being preferably $IrO_2$, $RuO_2$ or $SrTiO_3$ Referring next to FIG. 6b, there is shown schematically the portion of the wafer of FIG. 6a wherein excess conductor as well as patterned photoresist is stripped away using acetone or resist stripper to leave behind the patterned conductor, which are those conducting strips (125) that had conformally filled the spaces within the patterned photoresist.

Figure 6B:
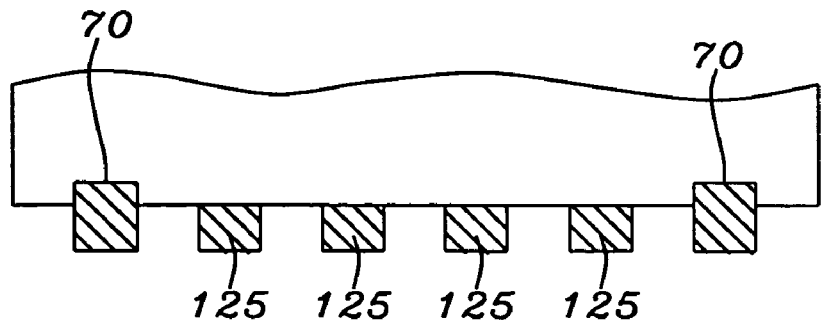
Figure 6C:
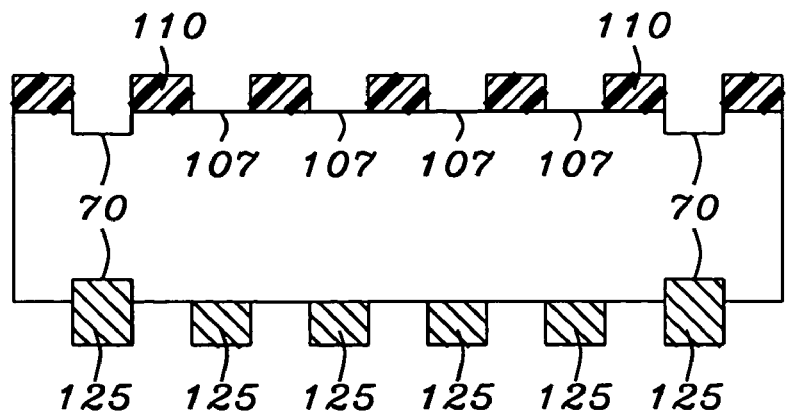

Referring next to FIG. 6c, there is shown the formation of a second patterned photoresist layer (110) on the first surface of the substrate. The alignment keys (70) have produced openings exposing regions (107) of the first substrate surface through the patterned photoresist that are correctly aligned with respect to the patterned conductor strips (125) previously formed on the lower substrate surface. The patterned photoresist is now thermally treated (baked) by raising the substrate to a temperature of approximately 180° C. The baked photoresist is hardened, thereby, and becomes an effective insulating material.

Figure 6D:
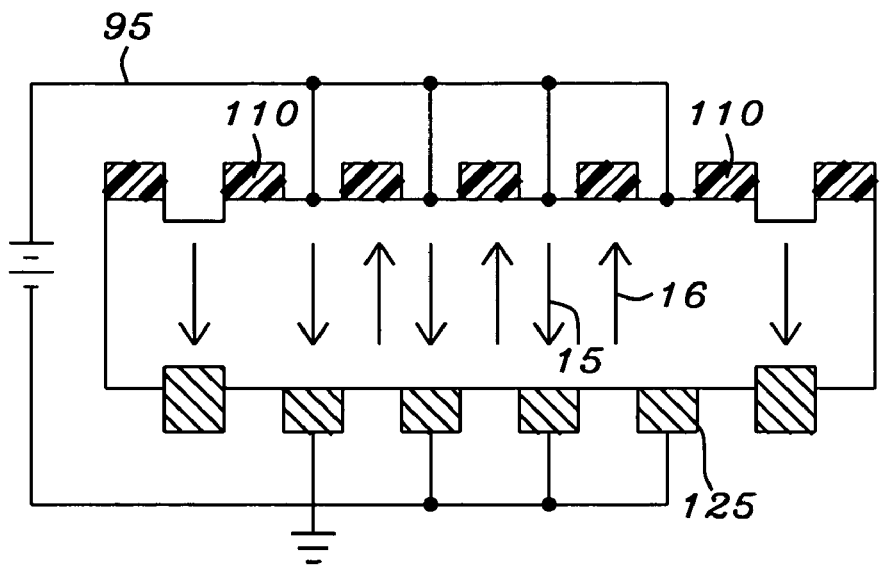

Referring next to FIG. 6d, there is schematically shown a circuit (95) formed between regions of the first substrate surface exposed by the patterned, hardened photoresist (110) and the conducting strips (125) on the second substrate surface. The exposed substrate is coated with a liquid conductor such as LiCl, a solution of KOH or other acid solutions or salt solutions, to enhance the electrical contacts. An electric field in the −z direction is produced between the contacts. Arrows (16) and (15) show the regions of original +z polarization (16) and the regions of domain reversal (15) produced by the electric field. The appropriate potential difference to create the domain reversals depends on materials and wafer thickness. For congruent $LiNbO_3$ a potential difference of more than 20.75 kV/mm at room temperature is preferred, but for MgO doped CLN, 4 kV/mm at 180° C. is preferred.

Referring again to FIG. 6d, an alternative preferred embodiment includes heating the wafer substrate prior to and/or during the application of the potential difference as shown in the figure. This process can significantly improve the formation of domain reversed regions and is an alternative embodiment of the invention.

Preferred Embodiment (Without and With Substrate Heating).

Figure 7A:
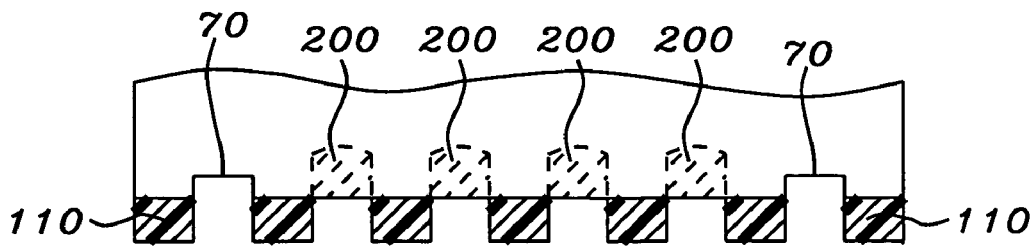
FIGS. 7a–f, in various combinations, schematically illustrate the application of a fifth, sixth and seventh embodiment of the image processing alignment method to a crystal having an alignment key formed thereon. A patterned layer of conductors is formed over a patterned ion-exchanged region. A layer of patterned, hardened photoresist is formed on the top surface of the crystal, so that the openings in the photoresist are vertically opposite the conducting strips on the lower surface. The openings in the photoresist are filled with a liquid conductor and a field is applied between said liquid conductor and the metal strips on the lower surface to create the desired domain reversals.

Referring first to FIG. 7a, there is schematically illustrated an initial process step of a fifth preferred embodiment being applied to a lower portion (second substrate surface) of a crystal substrate. In accord with the image processing alignment method, the crystal has alignment keys formed thereon in accord with the description of FIG. 1c. In this initial step, a patterned ion-exchanged region (200) has already been formed within the substrate through openings in a patterned layer of sputtered dielectric such as $SiO_2$, as has been described above with reference to FIGS. 4a and 4b in the description of the third preferred embodiment. Then the $SiO_2$ layer is removed and a layer of photoresist (110) is formed on the second substrate surface, patterned and thermally hardened. The formation of the patterned photoresist has already been described above with reference to FIG. 3a.

Such an ion-exchange process has been found to change domain spreading velocity beyond the immediate vicinity of the applied electric fields. The process of carrying out such an ion-exchange requires immersing the substrate in a Benzoic acid hot bath at a controlled temperature to achieve an optimized ion-exchanged profile.

Figure 7B:
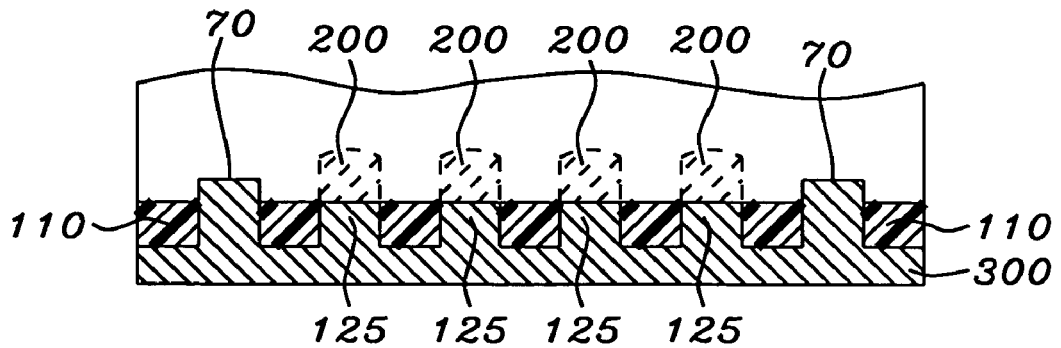

Referring next to FIG. 7b, there is shown schematically the second surface of the substrate with the ion-exchanged regions (200) as in FIG. 7a, still coated with the patterned photoresist (110). There is also shown schematically a layer of conducting material (300) that has been deposited by DC sputtering over the patterned photoresist. The conductor layer, which as already noted can be metal or a conducting oxide, covers the photoresist and fills the spaces (125) between the strips of patterned photoresist and thereby contacts the exposed surface of the wafer immediately above the ion-exchanged regions.

Figure 7C:
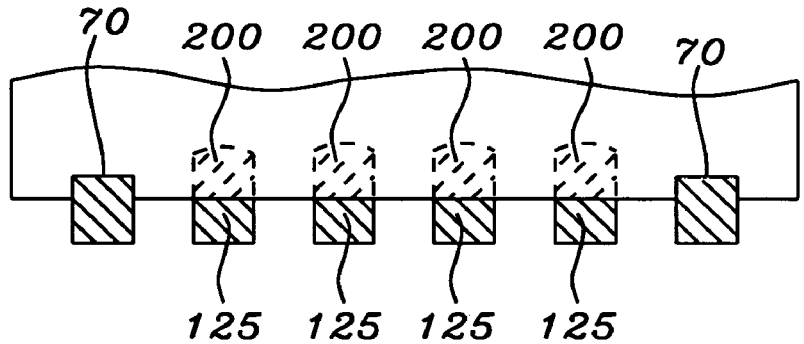

Referring next to FIG. 7c, there is shown schematically the substrate portion of FIG. 7b wherein excess conductor as well as patterned photoresist is stripped away using acetone or resist stripper to leave behind the patterned conductor, which are those conducting strips (125) that had filled the spaces of the patterned photoresist. The remaining conducting strips are positioned over the previously formed ion-exchanged regions (200).

Figure 7D:
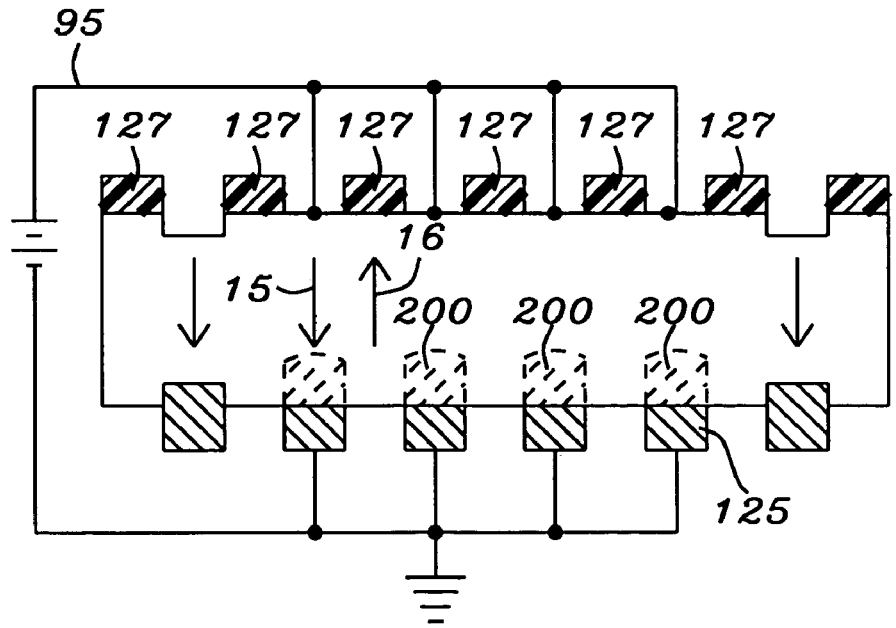

Referring next to FIG. 7d there is shown schematically a second layer of photoresist (127) formed on the first substrate surface and patterned in the same manner as was the first layer on the second substrate surface ((110) in FIG. 7a). The patterned photoresist layer on the first substrate surface is properly aligned with the patterned layer now removed from the second substrate surface. This patterned layer (127) is then hardened by thermal treatment to form a patterned layer of insulation. Electric fields are produced within the substrate between the lower surface patterned conductors and a liquid conductor contacting the upper substrate surface through the openings (129) in the patterned insulation. An electric field in the −z direction is produced between the contacts by means of a circuit (95). Arrows (16) and (15) show the regions of original +z polarization (16) and the regions of domain reversal (15) produced by the electric field. It is further noted that heating the substrate prior to and/or during electric field application may enhance the formation of domain reversals and is considered an alternative embodiment of the invention.

Sixth Preferred Embodiment (Without and With Substrate Heating).

Figure 7E:
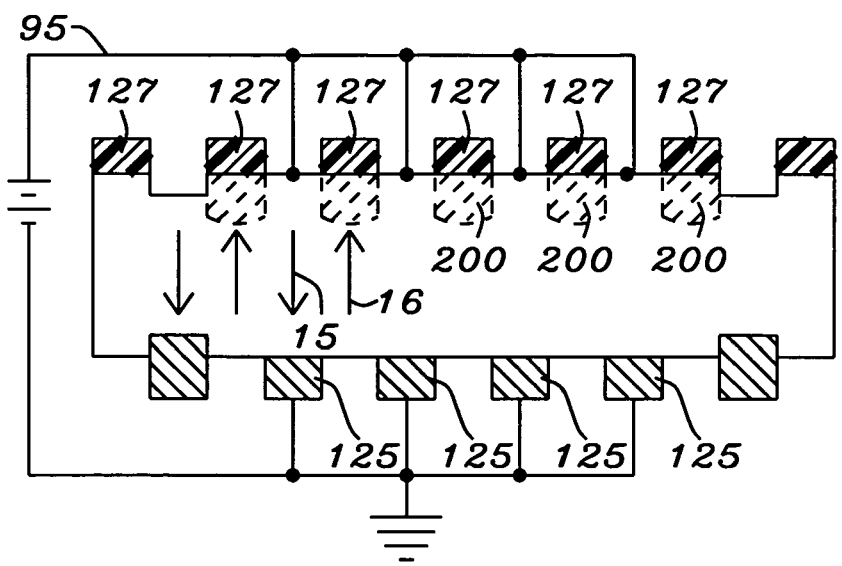

Referring next to FIG. 7e there is shown the basic configuration of electrical contacts as in FIG. 7d, but the ion-exchanged regions are beneath the hardened photoresist strips (127) in 7e rather than the conducting strips as in FIG. 7d. The placement of ion-exchanged regions on the first substrate surface depends on the region within which domain reversals are desired. Thus, instead of being aligned vertically with the conducting strips, the ion-exchanged regions are shifted to either side of the conducting strips. It is further noted that heating the substrate prior to and/or during the application of the electric field to the configuration of FIG. 7e may enhance the quality of the domain reversals produced thereby. Such substrate heating is an alternative embodiment of the invention.

Seventh Preferred Embodiment (Without and With Substrate Heating).

Figure 7F:
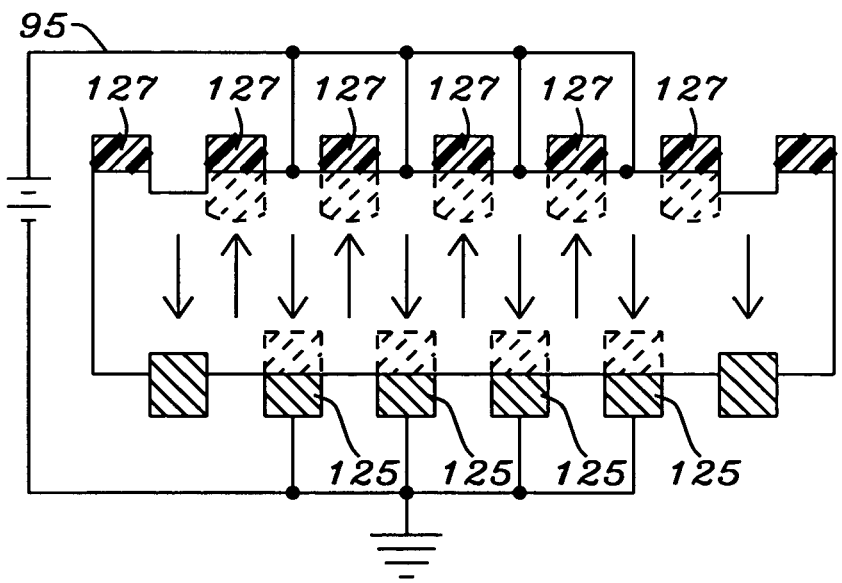

Referring next to FIG. 7f, there is shown a configuration that combines the ion-exchange region placement of both FIGS. 7d and 7e. In FIG. 7f, there are ion-exchange regions beneath the conductor strips on the second substrate surface as in FIG. 7d and also under the photoresist strips on the first substrate surface as in FIG. 7e. The particular location of the ion-exchanged regions leads to different domain reversal controllability. It is further noted that heating the substrate prior to and/or during the application of the electric field to the configuration of FIG. 7f may enhance the quality of the domain reversals produced thereby. Such substrate heating is an alternative embodiment of the invention.

Eighth Preferred Embodiment (Without and With Substrate Heating).

Figure 8A:
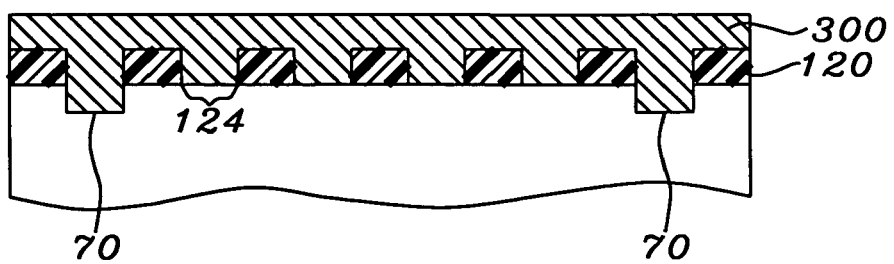
FIGS. 8a–d schematically illustrate the application of an eighth embodiment of the image processing alignment method to a crystal having an alignment key formed thereon. A patterned conducting layer is formed on an upper crystal surface. A patterned hardened layer of photoresist is formed on the lower crystal surface. The openings in the lower insulating layer are filled with a liquid conductor and domain reversing fields are applied between the upper patterned conductor and the lower liquid conductor.
Figure 8B:
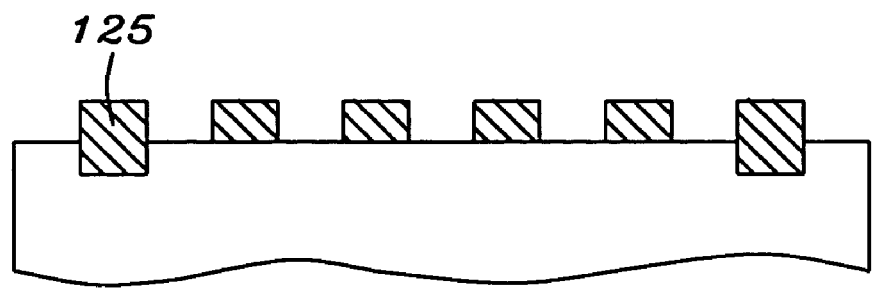

Referring first to FIG. 8a, there is schematically illustrated the application of the image processing alignment method to a crystal having an alignment key formed thereon in accord with the description of FIG. 1c. The figure shows only the first surface, for simplicity. A first layer of photoresist is formed on the first surface of the wafer and patterned (120) through a photomask (not shown) which is aligned by the alignment keys (70). There is also shown a layer of conducting material (300) that has been deposited by DC sputtering over the patterned photoresist (120). The conductor layer covers the photoresist and conformally fills the spaces (124) between the strips of patterned photoresist and thereby also contacts the exposed surface of the wafer. The conducting layer can be a metal, which is preferably Al, Cu, Ni, Cr, NiCr, Au, Ag, Ta, Ti, Pt or Mo or a conducting oxide, the oxide being preferably $IrO_2$, $RuO_2$ or $SrTiO_3$ Referring next to FIG. 8b, there is shown schematically the portion of the wafer of FIG. 8a wherein excess conductor as well as patterned photoresist is stripped away using acetone or resist stripper to leave behind the patterned conductor, which are those conducting strips (125) that had conformally filled the spaces of the patterned photoresist.

Figure 8C:
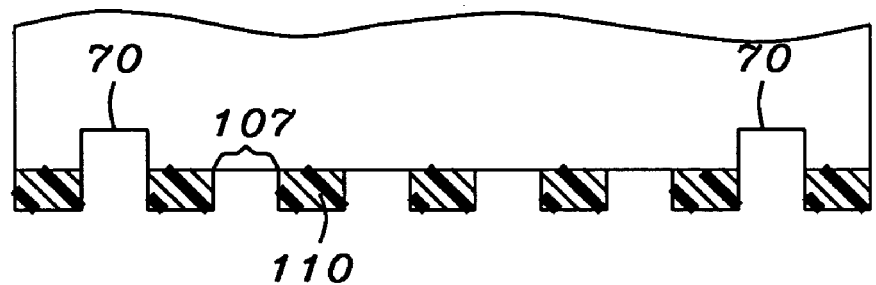

Referring next to FIG. 8c, there is shown the formation of a second patterned photoresist layer (110) on the second surface of the substrate. The alignment keys (70) have produced openings (107) to the second substrate surface through the patterned photoresist that are correctly aligned with respect to the patterned conductor strips ((125) in 8b) previously formed on the first substrate surface. The patterned photoresist is now thermally treated (baked) by raising the substrate to a temperature of approximately 180° C. The baked photoresist is hardened, thereby, and becomes an effective insulating material.

Figure 8D:
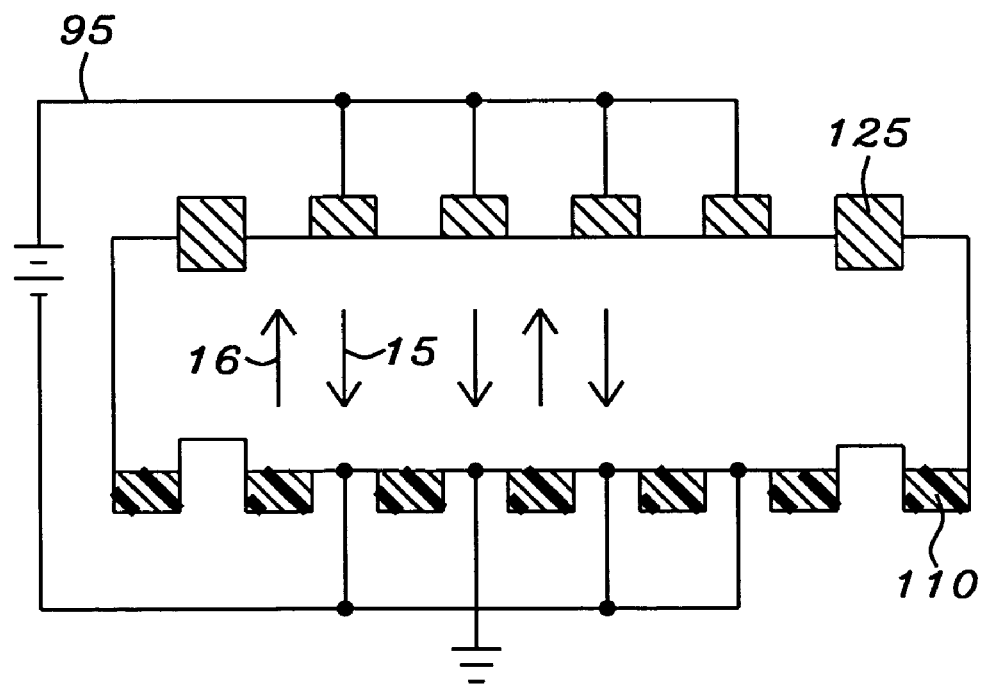

Referring next to FIG. 8d, there is schematically shown a circuit (95) formed between regions of the second substrate surface exposed by the patterned, hardened photoresist (110) and the conducting strips (125) on the first substrate surface. The exposed substrate is coated with a liquid conductor such as LiCl to enhance the electrical contacts. An electric field in the −z direction is produced between the contacts. Arrows (16) and (15) show the regions of original +z polarization (16) and the regions of domain reversal (15) produced by the electric field. The appropriate potential difference to create the domain reversals depends on materials and wafer thickness. For congruent $LiNbO_3$ a potential difference of more than 20.75 kV/mm at room temperature is preferred, but for MgO doped CLN, 4 kV/mm at 180° C. is preferred.

Referring again to FIG. 8d, an alternative preferred embodiment includes heating the wafer substrate prior to the application of the potential difference as shown in the figure. This process can significantly improve the formation of domain reversed regions.

Ninth Preferred Embodiment (Without and With Substrate Heating).

Figure 9A:
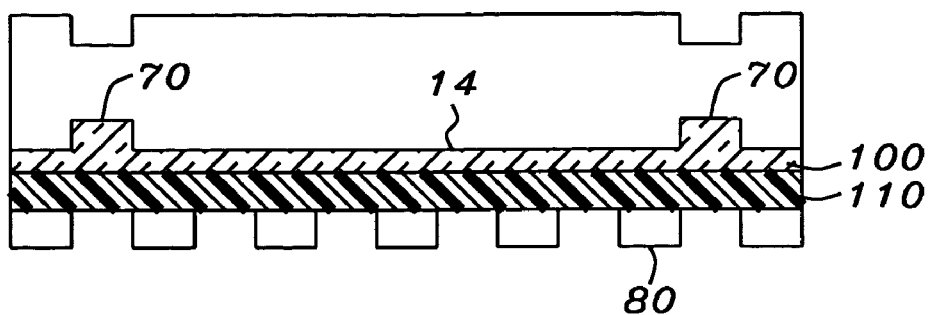
FIGS. 9a–e schematically illustrate the application of a ninth embodiment of the image processing alignment method to a crystal having an alignment key formed thereon. A patterned layer of $SiO_2$ is formed on a lower crystal surface. A patterned conducting layer is formed on the upper surface. An electric field is applied between the conducting strips and a liquid conductor deposited within the openings in the $SiO_2$ layer.

Referring first to FIG. 9a, there is schematically illustrated the application of the image processing alignment method to a crystal having an alignment key formed thereon in accord with the description of FIG. 1c. A planar layer of $SiO_2$ (100) of thickness between approximately 500 and 5000 angstroms, with approximately 2000 angstroms (200 nm) being preferred, is formed by sputtering or electron-beam deposition on a second crystal surface (14) and a layer of photoresist (110) is formed on the $SiO_2$. A photomask (80) like that also illustrated in FIG. 3a is formed on the photoresist and is aligned with the alignment keys (70).

Figure 9B:
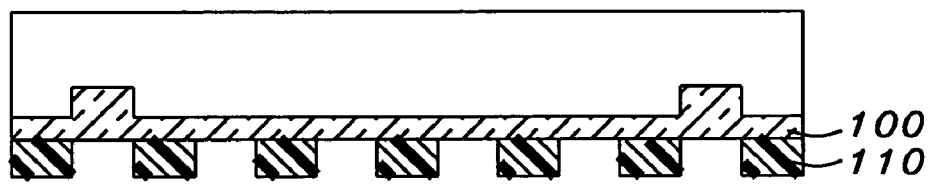

Referring next to FIG. 9b, there is seen a portion of the fabrication of FIG. 9a showing only the second substrate surface. The photoresist (10) is shown patterned through to the $SiO_2$ (100), then hardened by thermal processing in the same manner as described in reference to FIG. 3b. The hardened photoresist will be used as an etching mask to etch the $SiO_2$, which is done preferably using a buffered oxide etchant (BOE). Thermal processing as used in this invention and already noted includes heating by such means as a hot plate, an oven, a hot bath, a microwave or UV radiative exposure.

Figure 9C:
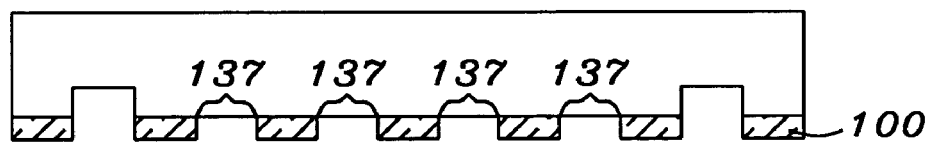

Referring now to FIG. 9c, the $SiO_2$ (100) is shown as having been etched through to the second substrate surface, using an etchant such as a buffered oxide etcher (BOE). The patterned photoresist has been removed. The exposed surface regions (137) of the lower surface are then coated with a liquid conductor as has been discussed previously.

Figure 9D:
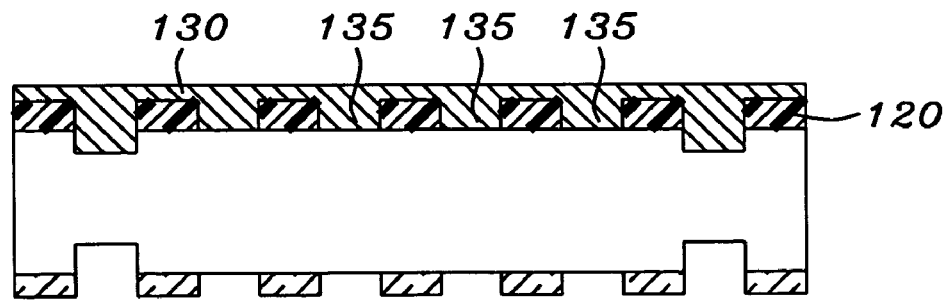

Referring to FIG. 9d, A first surface of the crystal is now coated with photoresist that is patterned (120) through a substantially identical photomask as illustrated in FIG. 9a. A conducting layer (130) is formed on the patterned photoresist (120), with the layer conformally filling the spaces between the photoresist (135).

Figure 9E:
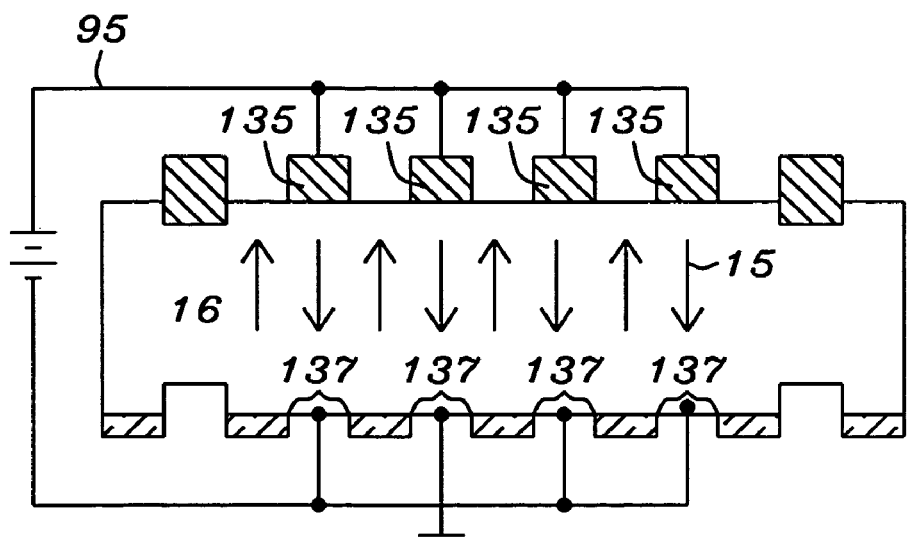

Referring to FIG. 9e, there is shown the removal of the photoresist by acetone or resist stripper, leaving behind the portions of the conducting layer within the spaces (135) which contact the substrate surface. There is schematically shown a circuit (95) connected between the conducting layer portions (135) contacting the upper substrate surface and the liquid conductor covered lower substrate surfaces (137) through which an electric field is applied to create domain inversions shown by arrows (15). Original polarizations are shown by arrows (16).

It is further noted that heating the substrate to an optimized temperature before applying the electric field as shown in FIG. 9e may provide substantial benefits by improving the quality of the domain reversals produced by the application of the domain-reversing electric fields. Such heating, combined with the subsequent electric field application, is yet another embodiment of this invention.

Although $SiO_2$ has been used herein as an insulating layer, other suitable materials include $Al_2O_3$ or $Si_3N_4$ or, as already indicated, hardened photoresist. The choice of insulating materials is related to the temperature at which the substrate will be processed, as certain insulating materials may be subject to shape distortion at high temperatures. In a related matter, the choice of optimum processing temperature will itself depend on the material of the substrate.

Tenth Preferred Embodiment (Without and With Substrate Heating).

Figure 10A:
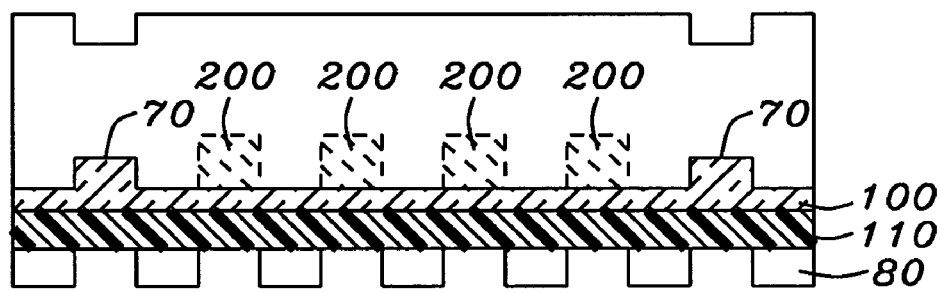
FIGS. 10a–f schematically illustrate the application of a tenth embodiment of the image processing alignment method to a crystal having an alignment key formed thereon. A patterned layer of $SiO_2$ is formed on a lower crystal surface and the openings in the $SiO_2$ and photoresist serve as a mask for an ion-exchange treatment through the exposed surface areas of the lower crystal surface. A patterned conducting layer is formed on the upper surface. An electric field is applied between the conducting strips and a liquid conductor deposited within the openings in the $SiO_2$ layer to create domain reversals that are enhanced by the ion-exchange treatment.

Referring first to FIG. 10a, there is schematically illustrated the first step in the application of the image processing alignment method to a crystal having an alignment key formed thereon in accord with the description of FIG. 1c. In FIG. 10a a pattern of ion-exchanged regions (200) has already been formed through the second substrate surface in accord with the description provided with FIGS. 4a, 4b and 5a. A layer of $SiO_2$ (100) of thickness between approximately 500 and 5000 angstroms with approximately 2000 angstroms being preferred, is formed by a method such as sputtering or e-beam deposition on the lower crystal surface through which the ion-exchanged regions have been formed and a layer of photoresist (110) is formed on the $SiO_2$ and patterned using an aligned photomask (80) as previously described in detail with reference to FIG. 3a.

Figure 10B:
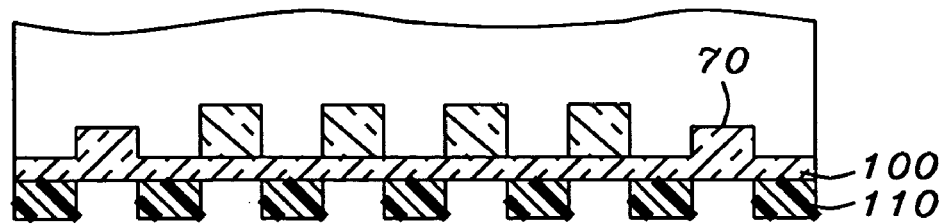

Referring next to FIG. 10b, the patterned photoresist of FIG. 10a is then hardened by thermal processing in the same manner as described in reference to FIG. 3b. The hardened photoresist is then used as an etching mask to etch the $SiO_2$ using buffered oxide etcher (BOE), for example, in accord with the etching process already described with reference to FIG. 4c.

Figure 10C:
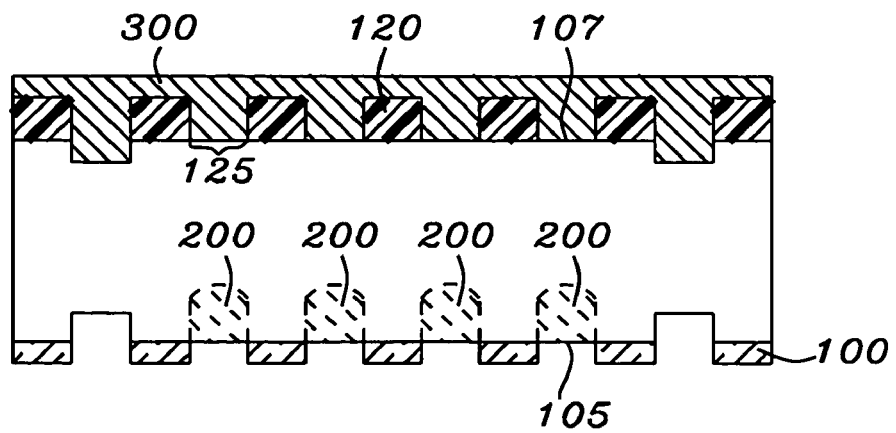

Referring next to FIG. 10c, the photoresist is removed, leaving the crystal in the form as pictured in the figure wherein there are exposed areas of substrate (105) beneath which are the ion-exchanged regions (200). Referring again to FIG. 10c, there is shown the crystal of FIG. 10b wherein a first (upper) surface of the crystal is now coated with photoresist which is patterned (120) through an aligned photomask (not shown) in accord with the description in FIG. 10a. There is also shown schematically a layer of conducting material (300) which has been deposited by DC sputtering over the patterned photoresist (120). The conductor layer covers the photoresist and fills the spaces (125) between the strips of patterned photoresist and thereby contacts the exposed surface of the wafer.

Figure 10D:
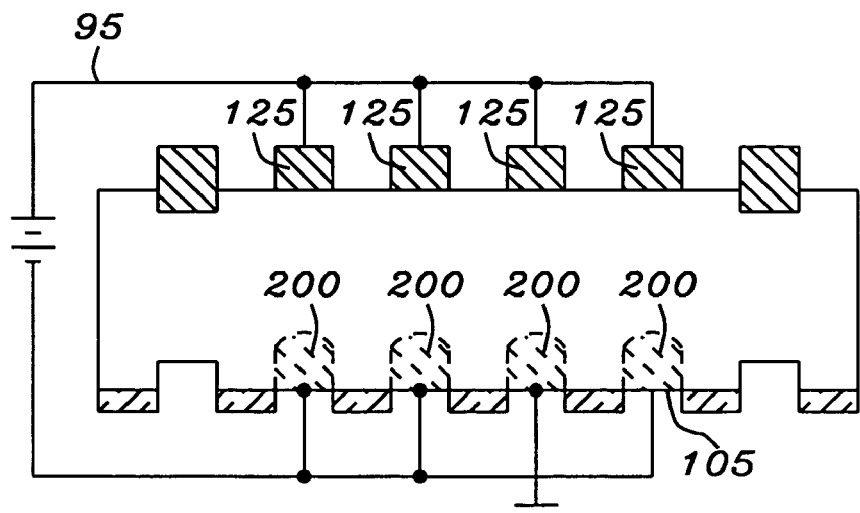

Referring next to FIG. 10d, there is shown schematically the wafer of FIG. 10c wherein excess conductor as well as patterned photoresist is stripped away using acetone or resist stripper to leave behind the patterned conductor, which are those conducting strips (125) that had filled the spaces of the patterned photoresist and which now make contact with the substrate surface. A circuit (95) connected between the metal conducting strips on the upper substrate surface (125) and the exposed lower substrate surfaces (105) above the ion-exchanged regions (200) through which an electric field is applied to create domain inversions shown by arrows (15). It is noted that contact between circuit elements and the lower exposed substrate surfaces (105) is obtained using the liquid conductors already noted. It is further noted that heating the substrate before and during electric field application may improve the process by which the circuit produces the domain-reversing electric fields and should be considered an alternative preferred embodiment of the invention.

Figure 10E:
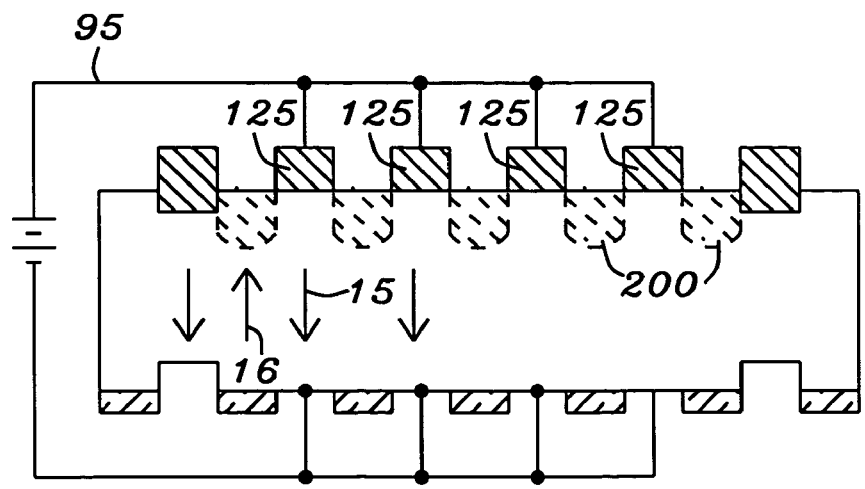
Figure 10F:
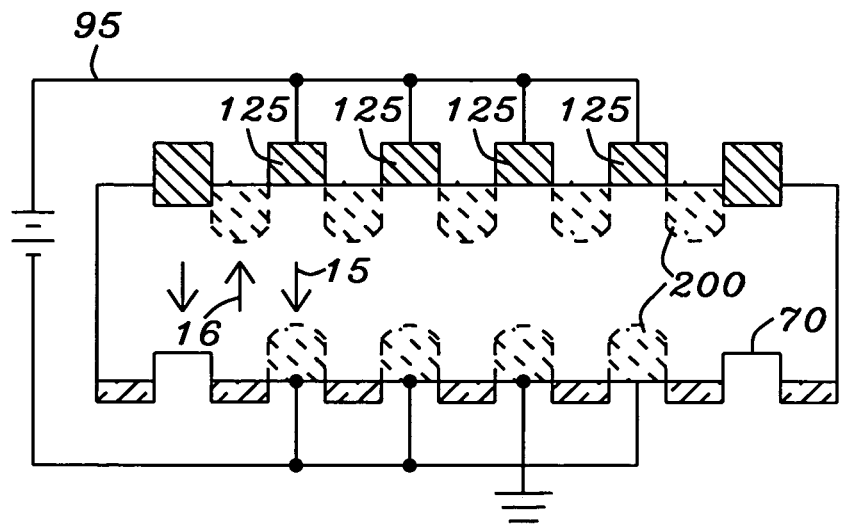

Referring to FIG. 10e and 10f, there is schematically shown embodiments in which patterned ion-exchange regions (200) identical to those of FIG. 10a are instead first formed beneath only the first surface (FIG. 10e) and through both first and second surfaces (FIG. 10f). The remaining formation steps are identical to those leading to FIG. 10e. It is noted that the ion-exchange regions beneath the first surface in FIGS. 10e and 10f are formed to either side of the metal conducting strips (125), thus providing a mechanism for limiting the lateral spread of domain reversed regions. The production of ion-exchanged regions at different positions within the crystal substrate offers an important method for controlling the quality of domain reversals. It is also noted that heating the substrate before and during electric field application within the configurations of FIG. 10e and 10f may improve the formation of domain reversals and such heating is an alternative embodiment of the present invention.

Eleventh Preferred Embodiment (Without and With Substrate Heating).

Referring first to FIG. 6a, there is schematically illustrated the first step in the application of a seventh version of the image processing alignment method to a crystal substrate having an alignment key formed thereon in accord with the description of FIG. 1c. The second surface of the crystal substrate is coated with photoresist which has been patterned (120) through an aligned photomask (not shown) in accord with the description in FIG. 3a. There is also shown schematically a layer of conducting material (300) that has been deposited by DC sputtering over the patterned photoresist (120). The conductor layer covers the photoresist and fills the spaces (125) between the strips of patterned photoresist and thereby contacts the exposed surface of the wafer.

Referring next to FIG. 6b, there is shown schematically the formation of FIG. 6a wherein excess conductor as well as patterned photoresist is stripped away using acetone or resist stripper to leave behind the patterned conductor, which are those conducting strips (125) that had filled the spaces of the patterned photoresist and which now make contact with the substrate surface.

Figure 11A:
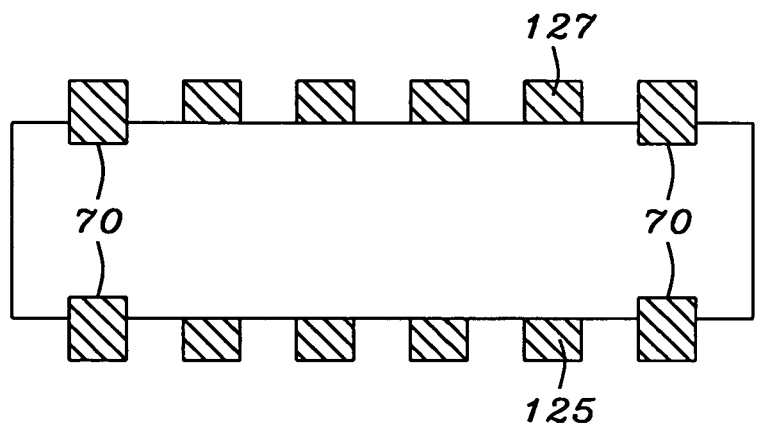
FIGS. 11a–b schematically illustrate the application of an eleventh embodiment of the image processing alignment method to a crystal having an alignment key formed thereon. A patterned conducting layer is formed on both an upper and a lower crystal surface. An electric field is applied between the conducting strips on the upper and lower surfaces to create domain reversals.

Referring now to FIG. 11a and with reference to the fabrication of patterned conductor strips as already illustrated schematically in FIGS. 6a–b, there is shown schematically a substrate in FIG. 11a wherein patterned conductor strips (127) have now also been formed on the first substrate surface which are identical to and vertically aligned with (ie. directly above) those formed in FIGS. 6a–b on the substrate second surface (125). The conducting strips of the first surface patterned conductor are correctly aligned with those of the second surface conductor as a result of using the alignment key (70) originally formed on both crystal surfaces.

Figure 11B:
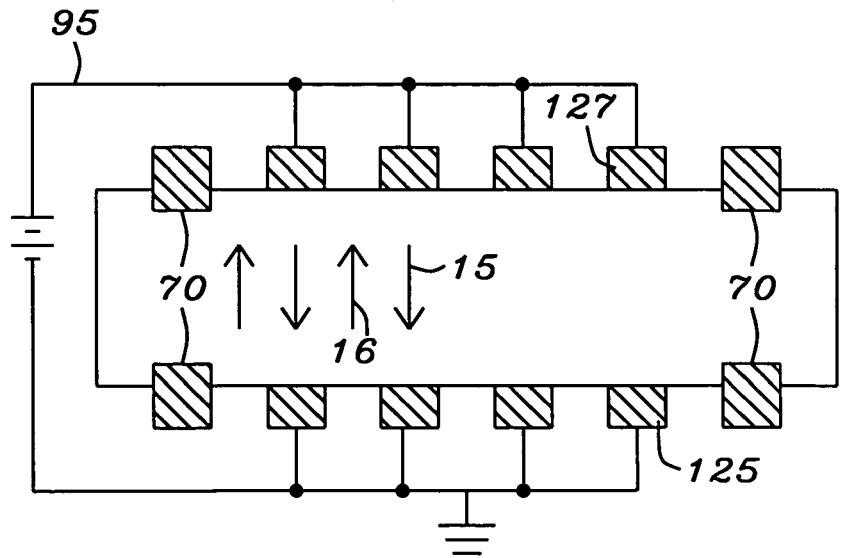

Referring to FIG. 11b, there is schematically shown a circuit (95) connected between the metal conducting strips on the first substrate surface (127) and the strips formed on the lower substrate surface (125), through which an electric field is applied to create domain inversions shown by arrows (15). The original polarization direction is shown by arrows (16). It is further noted that heating the substrate before and/or during field application may improve the process by which the circuit produces the domain-reversing electric fields. Such heating is an alternative embodiment of the present invention.

Twelfth Preferred Embodiment (Without and With Substrate Heating).

Referring first to FIG. 7a, there is schematically illustrated the first step in the application of a eighth version of the image processing alignment method to a crystal substrate having an alignment key formed thereon in accord with the description of FIG. 1c. A pattern of ion-exchanged regions (200) has been formed through the second crystal substrate surface in accord with the description provided with FIG. 7a.

Referring next to FIG. 7b, there is shown the second surface of the crystal substrate still coated with photoresist which has been patterned (110) through an aligned photomask in accord with the description in FIG. 7a. There is also shown schematically a layer of conducting material (300) that has been deposited by DC sputtering over the patterned photoresist (110). The conductor layer covers the photoresist and fills the spaces (125) between the strips of patterned photoresist and thereby contacts the exposed surface of the wafer.

Referring next to FIG. 7c, there is shown schematically the crystal of FIG. 7b wherein excess conductor as well as patterned photoresist is stripped away using acetone or resist stripper to leave behind the patterned conductor, which are those conducting strips (125) that had filled the spaces of the patterned photoresist and which now make contact with the substrate surface. The conducting strips are positioned immediately above the ion-exchanged regions Referring next to FIG. 12a, there is shown schematically the crystal of FIG. 7c wherein a patterned conductor, identical to that formed in FIGS. 7a–b on the crystal lower surface, has now been identically formed on the crystal upper surface. The conducting strips (125) of the lower patterned conductor are correctly aligned with those (125) of the upper patterned conductor as a result of using the alignment key originally formed on both crystal surfaces. A circuit (95) connected between the metal conducting strips on the upper substrate surface (125) above the ion-exchanged regions (200) and the strips formed on the lower substrate surface (129), through which an electric field is applied to create domain inversions shown by arrows (15). It is further noted that heating the substrate before and during field application may improve the process by which the circuit produces the domain-reversing electric fields. Such heating is an alternative embodiment of the invention.

Figure 12A:
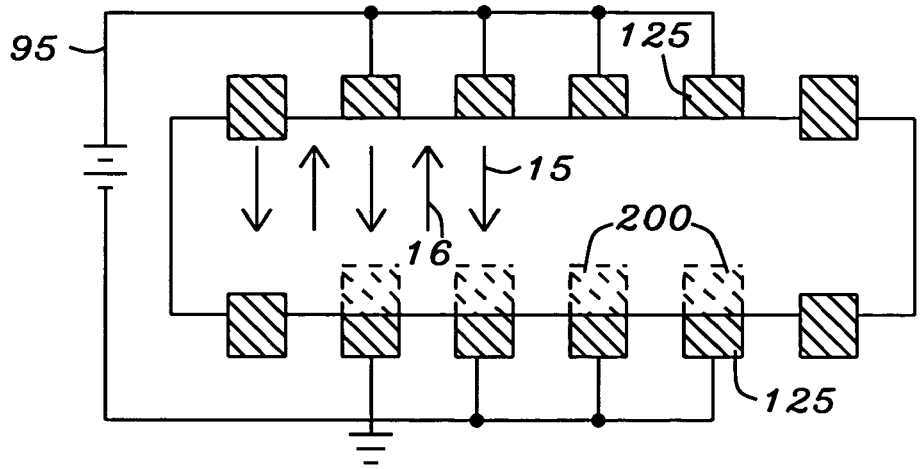
FIGS. 12a–c schematically illustrate the application of a twelfth embodiment of the image processing alignment method to a crystal having an alignment key formed thereon. A patterned ion-exchange treatment is applied to the upper crystal surface. A patterned conducting layer is formed on the upper surface. A patterned conducting layer is then formed on the lower surface. The resulting conducting strips are positioned over the ion-exchanged regions. An electric field is applied between the conducting strips on the top and bottom surfaces to create domain reversals that are enhanced by the ion-exchange treatment.
Figure 12B:
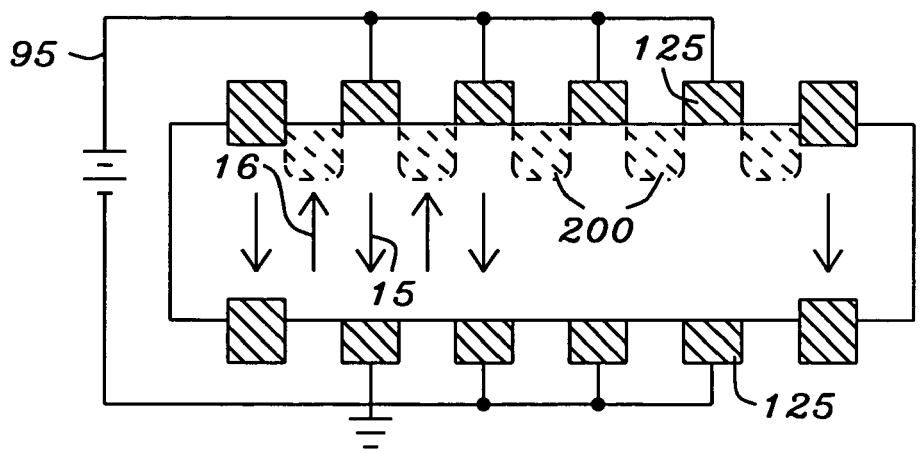

Referring to FIG. 12b there is shown the fabrication similar to that of FIG. 12a except ion-exchanged regions (200) have been formed under the first substrate surface and not under the second substrate surface as in FIG. 12a. Moreover, the location of the ion-exchange regions (300) is not directly beneath the conductor strips (125) on the first surface, but are under regions of the surface shifted by W to the left and right (in the x-direction) of the conductor strips. In this way, a polarization reversed domain is surrounded on either side by an ion-exchange regions, which limits the spreading of the domain in the x-direction.

Figure 12C:
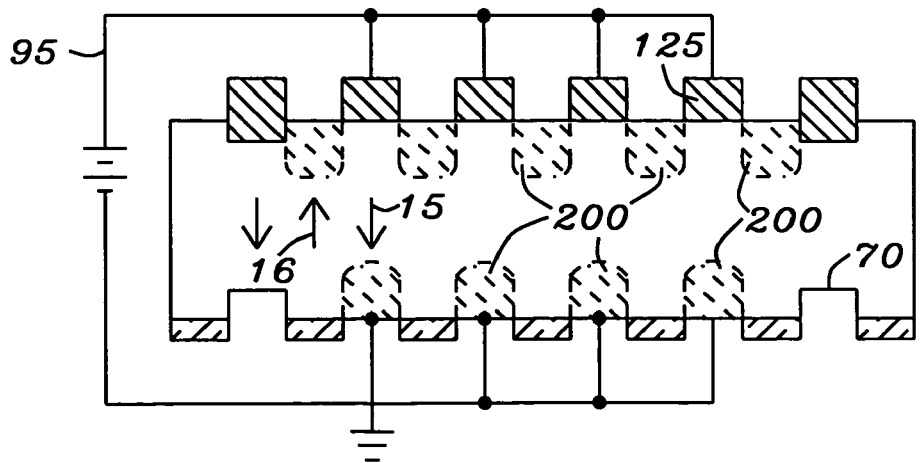

Referring to FIG. 12c there is shown the fabrication of FIG. 12b wherein there are regions of ion-exchange below a first surface (200) as in FIG. 12b and also beneath a second surface as in FIG. 12a.

Heating the substrate before and during electric field application in the configurations of FIGS. 12b and 12c may improve the process by which domain inversions are created. Such heating is an alternative embodiment of the invention.

As is understood by a person skilled in the art, the preferred embodiments of the present invention are illustrative of the present invention rather than limiting of the present invention. Revisions and modifications may be made to materials, structures and dimensions provided in forming sharply defined polarization reversed regions within non-linear ferroelectric materials, while still forming domain reversed regions within non-linear ferroelectric materials in accord with the spirit and scope of the present invention as defined by the appended claims.

What is claimed is:

1. A domain reversal alignment method for forming photolithographic mask alignment keys on surfaces of a unidirectionally polarized ferroelectric material comprising:
   providing a substrate which is a unidirectionally polarized ferroelectric material having opposing first and second planar surfaces which are substantially parallel and wherein said polarization is directed substantially towards said first surface from said second surface;
   forming a layer of photosensitive material on the first surface of said substrate;
   patterning said photosensitive layer to produce openings having an alignment key shape, said openings exposing corresponding surface regions of said substrate surface;
   hardening said photosensitive layer by thermal processing and rendering said layer, thereby, an insulator;
   coating said surface regions with a conducting liquid;
   producing an electric field in a region within the substrate interior between said exposed substrate first surface regions and second substrate surface, said electric field reversing the unidirectional polarization within said interior region; and then
   removing said photosensitive layer; and
   etching substrate first and second surfaces to produce, thereby, surface indentations having said alignment key shape on both the first and second substrate surfaces, the indentation on the first surface being vertically aligned with a corresponding indentation on the second surface and said surface indentations forming alignment keys for the subsequent alignment of photolithographic masks over said surfaces.

2. The method of claim 1 wherein electric field is produced by placing an external source of potential difference between said first and second surfaces by electrically contacting said first and second surfaces, wherein said first surface is electrically contacted by said conducting liquid coated on said exposed surface regions.

3. The method of claim 1 wherein said conducting liquid is benzoic acid, phosphoric acid or solutions of the salts LiCl or KOH.

4. The method of claim 1 wherein said ferroelectric material is congruent LiTaO$_3$ (CLT), congruent LiNbO$_3$ (CLN), stoichiometric LiNbO$_3$ (SLT), MgO doped CLT, or MgO doped CLN.

5. The method of claims 4 wherein the electric field is more than 20.75 kV/mm at room temperature for congruent LiNbO$_3$ and for MgO doped CLN it is approximately 4 kV/mm at 180° C.

6. The method of claim 1 wherein said photosensitive material is photoresist and it is hardened by being raised to a temperature of approximately 180° C.

7. A domain reversal alignment method for forming photolithographic mask alignment keys on surfaces of a unidirectionally polarized ferroelectric material comprising:
   providing a substrate which is a unidirectionally polarized ferroelectric material having opposing first and second planar surfaces which are substantially parallel and wherein said polarization is directed substantially towards said first surface from said second surface;
   forming a metallic or metal oxide conducting layer on the first surface of said substrate, said layer having an alignment key shape;
   producing an electric field within an interior region of the substrate between the first and second substrate surfaces and beneath said conducting layer, said electric field reversing the unidirectional polarization within said region; and then
   removing said conducting layers; and
   etching substrate first and second surfaces to produce, thereby, surface indentations having said alignment key shape on both the first and second substrate surfaces, the indentation on the first surface being vertically aligned with a corresponding indentation on the second surface and said surface indentations forming alignment keys for the subsequent alignment of photolithographic masks over said surfaces.

8. The method of claim 7 wherein said ferroelectric material is congruent LiTaO$_3$ (CLT), congruent LiNbO$_3$ (CLN), stoichiometric LiNbO$_3$ (SLT), MgO doped CLT, or MgO doped CLN.

9. The method of claim 8 wherein the electric field is more than 20.75 kV/mm at room temperature for congruent LiNbO$_3$ and for MgO doped CLN it is approximately 4 kV/mm at 180° C.

10. The method of claim 7 wherein the metallic conducting layer is Al, Cu, Ni, Cr, NiCr, Au, Ag, Ta, Ti, Pt, Mo and the conducting metallic oxides are IrO$_2$, RuO$_2$ or SrTiO$_3$.

11. The method of claim 7 wherein said electric field is produced by an external source of potential difference, said source electrically contacting said second surface and electrically contacting the conducting layer on said first surface.

12. A method for forming uniform domains of reversed polarization within a unidirectionally polarized ferroelectric material comprising:
   providing a substrate that is a unidirectionally polarized ferroelectric material having opposing first and second planar surfaces which are substantially parallel and wherein said polarization is directed substantially vertically towards said first surface and away from said second surface;
   forming alignment keys on said planar surfaces;
   using said alignment keys, forming, by a first process, a plurality of periodically spaced regions on said first surface and forming, by a second process, a plurality of periodically spaced regions on said second surface, all of said regions on said first surface being exposed or electrically contacted by a conducting layer and each of said regions being vertically aligned with a corresponding region on said second surface and all of said second surface regions being exposed or electrically contacted by a conducting layer;

coating all exposed surface regions with a conducting liquid;

electrically contacting the conducting liquid or conducting layer on said corresponding surface regions formed on said first and second surfaces;

producing an electric field within said substrate between said corresponding electrically contacted regions and thereby reversing said unidirectional polarization within the substrate interior between said regions.

13. The method of claim 12 wherein said alignment keys are formed by a method comprising:

forming a layer of photosensitive material on the first surface of said substrate;

patterning said photosensitive layer to produce openings having an alignment key shape, said openings exposing corresponding surface regions of said substrate surface;

hardening said photosensitive layer by thermal processing and rendering said layer, thereby, an insulator;

producing an electric field in a region between said exposed substrate first surface regions and second substrate surface, said electric field reversing the unidirectional polarization within said region; and then removing said photosensitive layer;

etching said first and second surfaces to produce, thereby, surface indentations having said alignment key shape on both the first and second substrate surfaces, the indentation on the first surface being vertically aligned with a corresponding indentation on the second surface and said surface indentations forming alignment keys.

14. The method of claim 13 wherein said photosensitive material is photoresist and it is hardened by being raised to a temperature of approximately 180° C.

15. The method of claim 12 wherein said alignment keys are formed by a method comprising:

forming a conducting layer on the first surface of said substrate, said layer having an alignment key shape;

producing an electric field within a region of the substrate between the first and second substrate surfaces and beneath said conducting layer, said electric field reversing the unidirectional polarization within said region; and then removing said conducting layer;

etching said first and second surfaces to produce, thereby, surface indentations having said alignment key shape on both the first and second substrate surfaces, the indentation on the first surface being vertically aligned with a corresponding indentation on the second surface and said surface indentations forming alignment keys.

16. The method of claim 15 wherein the conducting layer is a layer of the metal Al, Cu, Ni, Cr, NiCr, Au, Ag, Ta, Ti, Pt, Mo or the conducting metallic oxide $IrO_2$, $RuO_2$ or $SrTiO_3$.

17. The method of claim 12 wherein said first process comprises:

forming a first layer of photosensitive material on said first substrate surface;

patterning said first layer using a first photolithographic mask aligned with the alignment keys on the first substrate surface, thereby forming periodically spaced openings in said first layer and exposing corresponding regions of said first surface;

hardening said patterned first layer and rendering it an insulator by heating.

18. The method of claim 17 wherein said photosensitive material is photoresist and it is hardened by being raised to a temperature of approximately 180° C.

19. The method of claim 17 wherein said second process comprises:

forming a second layer of photosensitive material on said second substrate surface;

patterning said second layer using a second photolithographic mask, substantially identical to said first photolithographic mask, aligned with the alignment keys on the second substrate surface, thereby forming periodically spaced openings in said second layer that are vertically below said openings in the first layer and exposing corresponding regions of said second surface;

hardening said patterned second layer and rendering it an insulator by heating.

20. The method of claim 19 wherein said photosensitive material is photoresist and it is hardened by being raised to a temperature of approximately 180° C.

21. The method of claim 12 wherein said first process comprises:

forming a layer of photosensitive material on said first substrate surface;

patterning said layer using a first photolithographic mask aligned with the alignment keys on the first substrate surface, thereby forming openings in said layer and exposing corresponding regions of said first surface;

hardening said patterned layer and rendering it an insulator by heating.

22. The method of claim 21 wherein said photosensitive material is photoresist and it is hardened by being raised to a temperature of approximately 180° C.

23. The method of claim 21 wherein said second process comprises:

forming an insulating layer on said second surface;

forming a second layer of photosensitive material on said insulating layer;

patterning said photosensitive material using a second photolithographic mask substantially identical to said first mask aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material.

24. The method of claim 23 wherein said photosensitive material is photoresist and it is hardened by being raised to a temperature of approximately 180° C.

25. The method of claim 23 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

26. The method of claim 12 wherein said first process comprises:

forming a first layer of photosensitive material on said first substrate surface;

patterning said first layer using a first photolithographic mask aligned with the alignment keys on the first substrate surface, thereby forming periodically spaced openings in said first layer and exposing corresponding regions of said first surface;

hardening said patterned first layer by heating.

27. The method of claim 26 wherein said photosensitive material is photoresist and it is hardened by being raised to a temperature of approximately 180° C.

28. The method of claim 27 wherein said second process comprises:

forming an insulating layer on said second surface;

forming a layer of photosensitive material on said insulating layer;

patterning said photosensitive material using a second photolithographic mask substantially identical to said first photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions.

29. The method of claim 28 wherein said photosensitive material is photoresist and it is hardened by being raised to a temperature of approximately 180° C.

30. The method of claim 28 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

31. The method of claim 12 wherein said first process comprises:

forming an insulating layer on said first surface;

forming a first layer of photosensitive material on said insulating layer;

patterning said first layer of photosensitive material using a first photolithographic mask aligned by said alignment keys on said first surface, said patterning exposing periodically spaced surface regions of said insulating layer vertically below said exposed first surface regions;

hardening said patterned first layer of photosensitive material by heating;

etching through said insulating layer by applying an etching solution to said exposed surface regions, thereby exposing corresponding regions of said first substrate surface;

removing the patterned first layer of photosensitive material;

forming ion-exchanged regions within the substrate below said exposed second surface regions;

removing said insulating layer;

forming a second layer of photosensitive material on said first surface;

patterning said second layer using a second photolithographic mask aligned by said alignment keys on said first surface, said patterning leaving portions of said second layer positioned above said ion-exchanged regions and forming exposed first surface regions adjacent to each side of said ion-exchanged regions;

heating said patterned second layer to harden it and render it an insulator.

32. The method of claim 31 wherein said photosensitive material is photoresist and it is hardened by being raised to a temperature of approximately 180° C.

33. The method of claim 31 wherein said second process comprises:

forming an insulating layer on said second surface;

forming a layer of photosensitive material on said insulating layer;

patterning said photosensitive material using a third photolithographic mask substantially identical to said second photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material.

34. The method of claim 33 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

35. The method of claim 31 wherein said second process comprises:

forming an insulating layer on said second surface;

forming a layer of photosensitive material on said insulating layer;

patterning said photosensitive material using a third photolithographic mask substantially identical to said second photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions.

36. The method of claim 35 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

37. The method of claim 12 wherein said first process comprises:

forming a first layer of photosensitive material on said first substrate surface;

patterning said first layer using a first photolithographic mask aligned with the alignment keys on the first substrate surface, thereby forming periodically spaced openings in said first layer and exposing corresponding regions of said first surface;

hardening said patterned first layer and rendering it an insulator by heating.

38. The method of claim 37 wherein said photosensitive material is photoresist and it is hardened by being raised to a temperature of approximately 180° C.

39. The method of claim 37 wherein said second process comprises:
    forming a second layer of photosensitive material on said second substrate surface;
    patterning said second layer using a second photolithographic mask substantially identical to said first photolithographic mask aligned with the alignment keys on the second substrate surface, thereby forming periodically spaced openings in said second layer and exposing corresponding regions of said second surface vertically below the periodically spaced openings on the first surface;
    forming a conducting layer over said patterned second layer, a portion of said conducting layer conformally filling each periodically spaced opening in said second layer and each said portion thereby electrically contacting the exposed surface regions of said second surface;
    removing said patterned second layer, leaving, thereby, only said portions of said conducting layer electrically contacting said exposed regions of said second surface.

40. The method of claim 39 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$ and the photosensitive material is photoresist.

41. The method of claim 37 wherein said second process comprises:
    forming an insulating layer on said second surface;
    forming a layer of photosensitive material on said insulating layer;
    patterning said photosensitive material using a second photolithographic mask substantially identical to said first photolithographic mask and aligned by said alignment keys on said second surface, said patterning exposing periodically spaced surface regions of said insulating layer vertically below said exposed first surface regions;
    hardening said patterned photosensitive material by heating;
    etching through said insulating layer by applying an etching solution to said exposed surface regions, thereby exposing corresponding regions of said second substrate surface;
    removing the patterned photosensitive material;
    forming ion-exchanged regions within the substrate below said exposed second surface regions;
    removing said insulating layer;
    forming a second layer of photosensitive material on said second substrate surface;
    patterning said second layer using a third photolithographic mask substantially identical to said second photolithographic mask aligned with the alignment keys on the second substrate surface, thereby forming periodically spaced openings in said second layer and exposing corresponding regions of said second surface vertically below the periodically spaced openings on the first surface;
    forming a conducting layer over said patterned second layer, a portion of said conducting layer conformally filling each periodically spaced opening in said second layer and each said portion thereby electrically contacting the exposed surface regions of said second surface over said ion-exchanged regions;
    removing said patterned second layer, leaving, thereby, only said portions of said conducting layer electrically contacting said exposed regions of said second surface.

42. The method of claim 41 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist that is hardened by heating to 180° C.

43. The method of claim 37 wherein said second process comprises:
    forming a layer of photosensitive material on said second substrate surface;
    patterning said second layer using a second photolithographic mask, substantially identical to said first photolithographic mask, aligned with the alignment keys on the second substrate surface, thereby forming periodically spaced openings in said second layer and exposing corresponding regions of said second surface vertically below the periodically spaced openings on the first surface;
    forming a conducting layer over said patterned second layer, a portion of said conducting layer conformally filling each periodically spaced opening in said second layer and each said portion thereby electrically contacting the exposed surface regions of said second surface;
    removing said patterned second layer, leaving, thereby, only said portions of said metal layer electrically contacting said exposed regions of said second surface.

44. The method of claim 43 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

45. The method of claim 43 wherein the photosensitive material is photoresist.

46. The method of claim 37 wherein said second process comprises:
    forming an insulating layer on said second surface;
    forming a layer of photosensitive material on said insulating layer;
    patterning said photosensitive material using a third photolithographic mask substantially identical to said first photolithographic mask and aligned by said alignment keys on said second surface, said patterning exposing periodically spaced surface regions of said insulating layer vertically below said exposed first surface regions;
    hardening said patterned photosensitive material by heating;
    etching through said insulating layer by applying an etching solution to said exposed surface regions, thereby exposing corresponding regions of said second substrate surface;
    removing the patterned photosensitive material;
    forming ion-exchanged regions within the substrate below said exposed second surface regions;
    removing said insulating layer;
    forming a second layer of photosensitive material on said second substrate surface;
    patterning said second layer using a fourth photolithographic mask substantially identical to said second photolithographic mask aligned with the alignment keys on the second substrate surface, thereby forming periodically spaced openings in said second layer and exposing corresponding regions of said second surface vertically below the periodically spaced openings on the first surface;

forming a conducting layer over said patterned second layer, a portion of said conducting layer conformally filling each periodically spaced opening in said second layer and each said portion thereby electrically contacting the exposed surface regions of said second surface over said ion-exchanged regions;

removing said patterned second layer, leaving, thereby, only said portions of said metal layer electrically contacting said exposed regions of said second surface.

47. The method of claim 46 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

48. The method of claim 12 wherein said first process comprises:

forming a layer of photosensitive material on said first substrate surface;

patterning said layer using a first photolithographic mask aligned with the alignment keys on the second substrate surface, thereby forming periodically spaced openings in said second layer and exposing corresponding regions of said second surface vertically below the periodically spaced openings on the first surface;

forming a conducting layer over said patterned layer, a portion of said conducting layer conformally filling each periodically spaced opening in said second layer and each said portion thereby electrically contacting the exposed surface regions of said second surface;

removing said patterned layer, leaving, thereby, only said portions of said metal layer electrically contacting said exposed regions of said second surface.

49. The method of claim 48 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

50. The method of claim 48 wherein said second process comprises:

forming a layer of photosensitive material on said second substrate surface;

patterning said first layer using a second photolithographic mask aligned with the alignment keys on the first substrate surface, thereby forming periodically spaced openings in said first layer and exposing corresponding regions of said first surface;

hardening said patterned first layer by heating.

51. The method of claim 50 wherein said photosensitive material is photoresist and it is hardened by being raised to a temperature of approximately 180° C.

52. The method of claim 48 wherein said second process comprises:

forming an insulating layer on said second surface;

forming a layer of photosensitive material on said insulating layer;

patterning said photosensitive material using a second photolithographic mask substantially identical to said first photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material.

53. The method of claim 52 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist and it is hardened by heating to approximately 180° C.

54. The method of claim 48 wherein said second process comprises:

forming an insulating layer on said second surface;

forming a layer of photosensitive material on said insulating layer;

patterning said photosensitive material using a second photolithographic mask substantially identical to said second photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions.

55. The method of claim 54 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist and it is hardened by heating to approximately 180° C.

56. The method of claim 12 wherein said first process comprises:

forming an insulating layer on said first surface;

forming a first layer of photosensitive material on said insulating layer;

patterning said first layer of photosensitive material using a first photolithographic mask aligned by said alignment keys on said first surface, said patterning exposing periodically spaced surface regions of said insulating layer vertically below said exposed first surface regions;

hardening said patterned first layer of photosensitive material by heating;

etching through said insulating layer by applying an etching solution to said exposed surface regions, thereby exposing corresponding regions of said first substrate surface;

removing the patterned first layer of photosensitive material;

forming ion-exchanged regions within the substrate below said exposed second surface regions;

removing said insulating layer;

forming a second layer of photosensitive material on said first surface;

patterning said second layer using a second photolithographic mask aligned by said alignment keys on said first surface, said patterning leaving portions of said second layer positioned above said ion-exchanged regions and forming exposed first surface regions adjacent to each side of said ion-exchanged regions;

forming a conducting layer over said patterned second layer, a portion of said conducting layer conformally filling each periodically spaced opening in said second layer and each said portion thereby electrically contacting the exposed surface regions of said second surface;

removing said patterned layer, leaving, thereby, only said portions of said conducting layer electrically contacting said exposed regions of said second surface.

57. The method of claim 56 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

58. The method of claim 56 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

59. The method of claim 56 wherein said second process comprises:

forming an insulating layer on said second surface;

forming a layer of photosensitive material on said insulating layer;

patterning said photosensitive material using a second photolithographic mask substantially identical to said first photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material.

60. The method of claim 59 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist and it is hardened by heating to approximately 180° C.

61. The method of claim 56 wherein said second process comprises:

forming an insulating layer of on said second surface;

forming a layer of photosensitive material on said insulating layer;

patterning said photosensitive material using a second photolithographic mask substantially identical to said second photolithographic mask and aligned by said alignment keys on said second surface, said patterning exposing periodically spaced surface regions of said insulating layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions.

62. The method of claim 61 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist and it is hardened by heating to approximately 180° C.

63. The method of claim 56 wherein said second process comprises:

forming a layer of photosensitive material on said second substrate surface;

patterning said second layer using a second photolithographic mask, substantially identical to said first photolithographic mask, aligned with the alignment keys on the second substrate surface, thereby forming periodically spaced openings in said second layer and exposing corresponding regions of said second surface vertically below the periodically spaced openings on the first surface;

forming a conducting layer over said patterned second layer, a portion of said conducting layer conformally filling each periodically spaced opening in said second layer and each said portion thereby electrically contacting the exposed surface regions of said second surface over said ion-exchanged regions;

removing said patterned second layer, leaving, thereby, only said portions of said metal layer electrically contacting said exposed regions of said second surface.

64. The method of claim 63 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

65. The method of claim 63 wherein said photosensitive material is photoresist.

66. The method of claim 56 wherein said second process comprises:

forming an insulating layer on said second surface;

forming a layer of photosensitive material on said insulating layer;

patterning said photosensitive material using a second photolithographic mask substantially identical to said first photolithographic mask and aligned by said alignment keys on said second surface, said patterning exposing periodically spaced surface regions of said $SiO_2$ layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions;

removing said insulating layer;

forming a second layer of photosensitive material on said second substrate surface;

patterning said second layer using a third photolithographic mask substantially identical to said second photolithographic mask aligned with the alignment keys on the second substrate surface, thereby forming periodically spaced openings in said second layer and exposing corresponding regions of said second surface vertically below the periodically spaced openings on the first surface;

forming a conducting layer over said patterned second layer, a portion of said conducting layer conformally filling each periodically spaced opening in said second layer and each said portion thereby electrically contacting the exposed surface regions of said second surface over said ion-exchanged regions;

removing said patterned second layer, leaving, thereby, only said portions of said metal layer electrically contacting said exposed regions of said second surface.

67. The method of claim 66 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

68. The method of claim 66 wherein said insulating layer is a layer of $SiO_2$, $Al_2O_3$, $Si_3N_4$ or hardened photoresist formed to a thickness between approximately 500 and 5000 angstroms by sputtering or e-beam deposition and wherein the photosensitive material is photoresist.

69. The method of claim 56 wherein said second process comprises:

forming a layer of photosensitive material on said second substrate surface;

patterning said second layer using a second photolithographic mask, substantially identical to said first photolithographic mask, aligned with the alignment keys on the second substrate surface, thereby forming periodically spaced openings in said second layer and exposing corresponding regions of said second surface vertically below the periodically spaced openings on the first surface;

forming a conducting layer over said patterned second layer, a portion of said conducting layer conformally filling each periodically spaced opening in said second layer and each said portion thereby electrically contacting the exposed surface regions of said second surface over said ion-exchanged regions;

removing said patterned second layer, leaving, thereby, only said portions of said conducting layer electrically contacting said exposed regions of said second surface.

70. The method of claim 69 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

71. The method of claim 69 wherein the photosensitive material is photoresist.

72. The method of claim 56 wherein said second process comprises:

forming an insulating layer on said second surface;

forming a layer of photosensitive material on said insulating layer;

patterning said photosensitive material using a second photolithographic mask substantially identical to said first photolithographic mask and aligned by said alignment keys on said second surface, said patterning exposing periodically spaced surface regions of said $SiO_2$ layer vertically below said exposed first surface regions;

hardening said patterned photosensitive material by heating;

etching through said insulating layer by applying an etching solution to said exposed surface regions, thereby exposing corresponding regions of said second substrate surface;

removing the patterned photosensitive material;

forming ion-exchanged regions within the substrate below said exposed second surface regions;

removing said insulating layer;

forming a second layer of photosensitive material on said second substrate surface;

patterning said second layer using a third photolithographic mask substantially identical to said second photolithographic mask aligned with the alignment keys on the second substrate surface, thereby forming periodically spaced openings in said second layer and exposing corresponding regions of said second surface vertically below the periodically spaced openings on the first surface;

forming a conducting layer over said patterned second layer, a portion of said conducting layer conformally filling each periodically spaced opening in said second layer and each said portion thereby electrically contacting the exposed surface regions of said second surface over said ion-exchanged regions;

removing said patterned second layer, leaving, thereby, only said portions of said metal layer electrically contacting said exposed regions of said second surface.

73. The method of claim 72 wherein the conducting layer is a layer of the metallic conductors Al, Cu, Ni, Cr, NiCr, Au, Ag, Ta, Ti, Pt, Mo or the conducting metallic oxides $IrO_2$, $RuO_2$ or $SrTiO_3$.

74. The method of claim 72 wherein said photosensitive material is photoresist.

75. The method of claim 12 wherein the ferroelectric material is congruent $LiTaO_3$ (CLT), congruent $LiNbO_3$ (CLN), stoichiometric $LiNbO_3$ (SLT), MgO doped CLT, or MgO doped CLN.

76. The method of claim 75 wherein the electric field is more than 20.75 kV/mm at room temperature for congruent $LiNbO_3$ and for MgO doped CLN it is approximately 4 kV/mm at 180° C.

77. The method of claim 12 wherein said conducting liquid is benzoic acid, phosphoric acid or a solution of the salts KOH or LiCl.

78. The method of claim 12 wherein said substrate is heated to an optimal temperature that is less than approximately 250° C. during application of the electric field.

* * * * *